(12) United States Patent
Snyder et al.

(10) Patent No.: US 8,734,025 B2
(45) Date of Patent: May 27, 2014

(54) CABLE TERMINATION DEVICE

(75) Inventors: Jennifer Kerwin Snyder, Tacoma, WA (US); Michael Andrew Slater, Bremerton, WA (US); John Carlos Espana, Bend, OR (US); Richard Karl Jones, Beaverton, OR (US)

(73) Assignee: Leidos, Inc., Reston, VA (US)

( * ) Notice: Subject to any disclaimer, the term of this patent is extended or adjusted under 35 U.S.C. 154(b) by 137 days.

(21) Appl. No.: 13/562,035

(22) Filed: Jul. 30, 2012

(65) Prior Publication Data

US 2014/0029898 A1    Jan. 30, 2014

(51) Int. Cl.
G02B 6/00        (2006.01)
G02B 6/36        (2006.01)
H01R 13/648      (2006.01)
H01R 9/05        (2006.01)

(52) U.S. Cl.
USPC .............................. 385/77; 385/147; 439/583

(58) Field of Classification Search
USPC .......... 385/77–90, 147; 439/204, 583, 607.41
See application file for complete search history.

(56) References Cited

U.S. PATENT DOCUMENTS

| | | | |
|---|---|---|---|
| 4,794,490 A * | 12/1988 | Epstein ......................... | 361/827 |
| 5,037,177 A | 8/1991 | Brown et al. | |
| 5,185,580 A * | 2/1993 | Nichols et al. ................ | 324/539 |
| 5,903,164 A * | 5/1999 | Kline ....................... | 324/756.06 |
| 6,210,222 B1 * | 4/2001 | Langham et al. ............. | 439/583 |
| 6,796,821 B2 | 9/2004 | Cairns et al. | |
| 7,762,847 B2 * | 7/2010 | Feldman et al. ......... | 439/607.41 |

OTHER PUBLICATIONS

Drawings labeled "Pre-Existing Cable Design 1"; prior to Jul. 30, 2012.
Drawings labeled "Pre-Existing Cable Design 2"; prior to Jul. 30, 2012.
Drawings labeled "Pre-Existing Cable Design 3"; prior to Jul. 30, 2012.
Drawings labeled "Pre-Existing Cable Design 4"; prior to Jul. 30, 2012.

* cited by examiner

*Primary Examiner* — Akm Enayet Ullah
(74) *Attorney, Agent, or Firm* — Banner & Witcoff, Ltd.

(57) ABSTRACT

A cable termination device may include one or more components that are generic to multiple types and/or sizes of cable. The device may further comprise one or more components that are specific to a particular cable type and/or size. The cable-generic components can be combined with cable-specific components applicable to the particular cable type and/or size so as to assemble a termination device attached to an end of a cable of that particular type and/or size. The cable-generic components could alternatively be combined with cable-specific components applicable to a different cable type and/or size so as to assemble a termination device attached to an end of a cable of that different type and/or size.

27 Claims, 31 Drawing Sheets

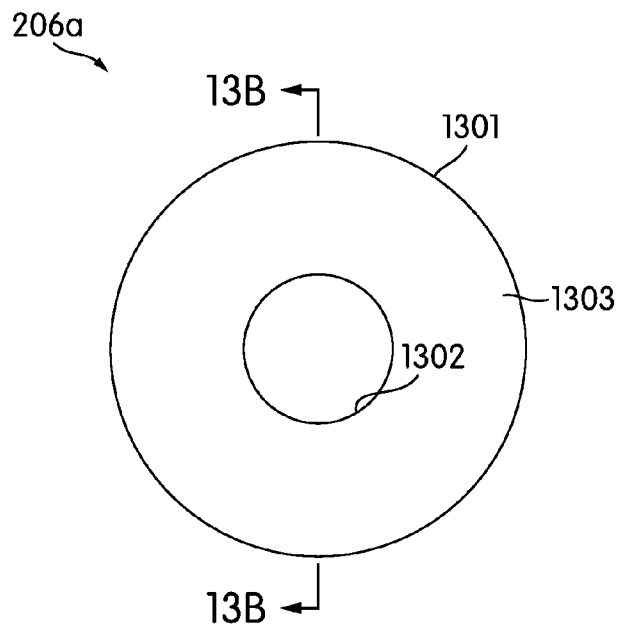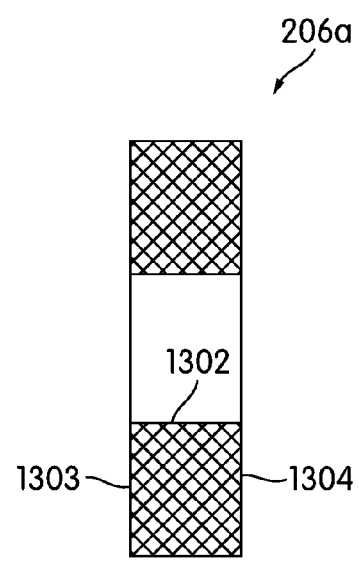# FIG. 13A FIG. 13B
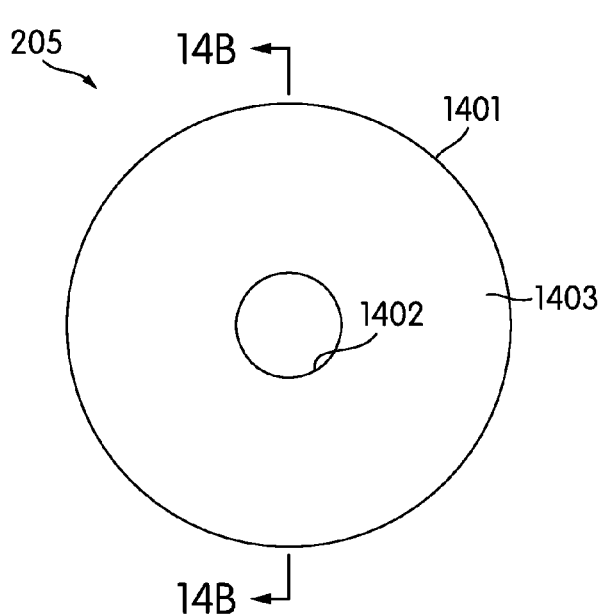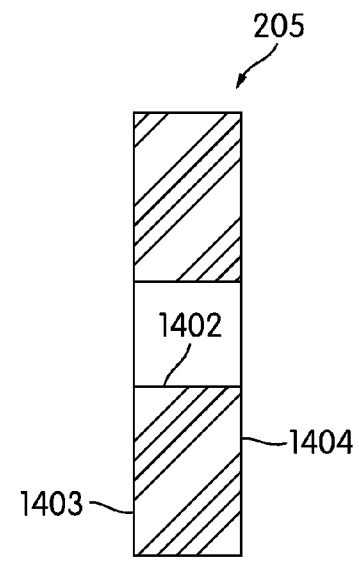# FIG. 14A FIG. 14B

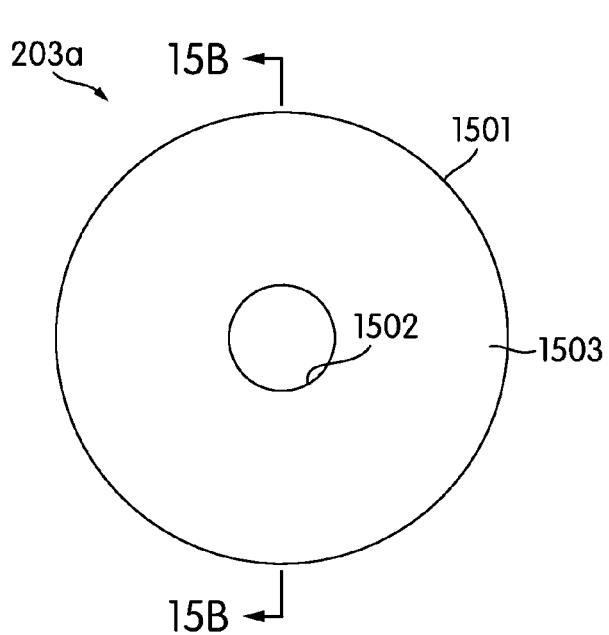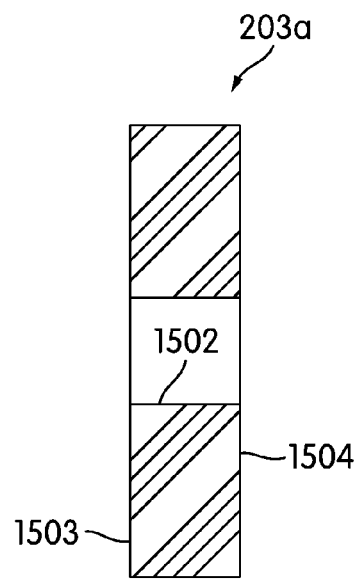
FIG. 15A    FIG. 15B
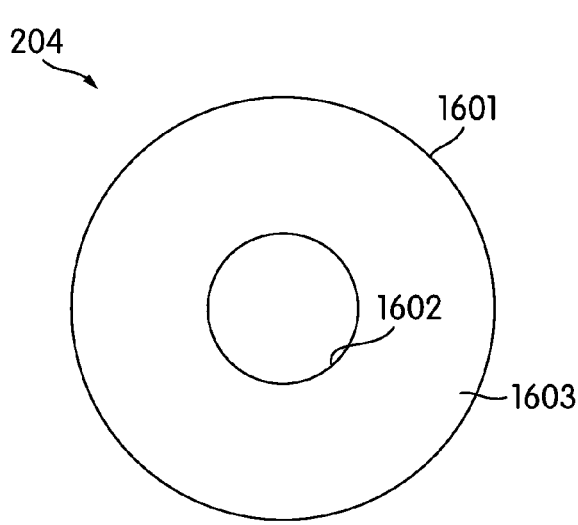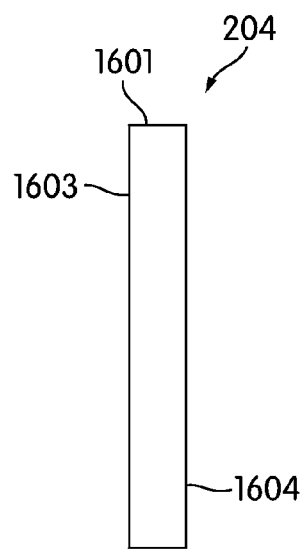
FIG. 16A    FIG. 16B

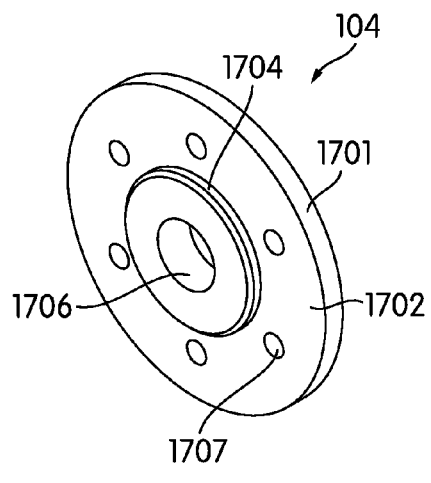
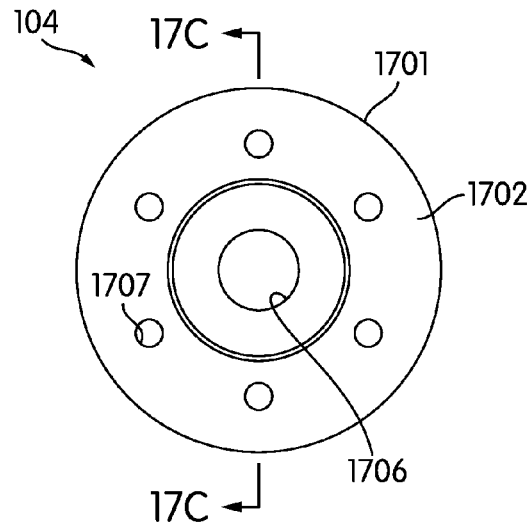
FIG. 17A
FIG. 17B
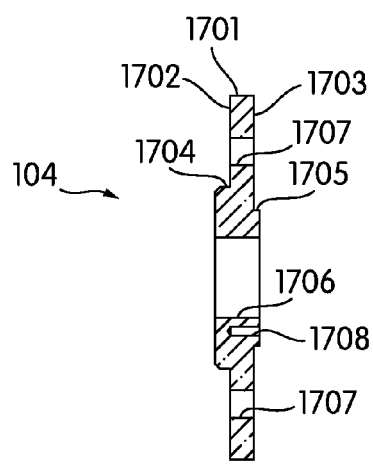
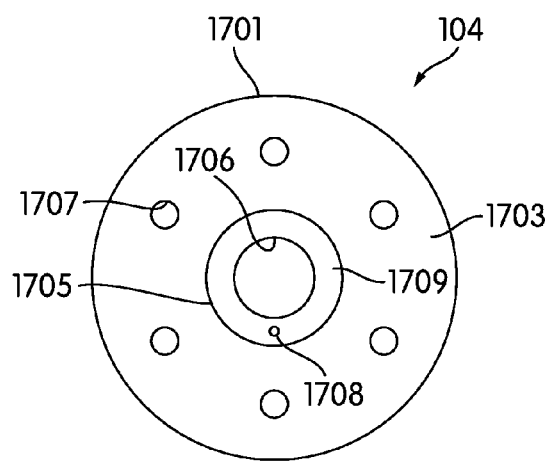
FIG. 17C
FIG. 17D

CABLE TERMINATION DEVICE

BACKGROUND

Electro-optical cables can be used to transmit communications signals and/or electrical power in a variety of underwater applications. Electro-optical cables intended for underwater use can vary widely in size and design. Typically, however, such cables will include an inner core that contains one or more optical fibers and multiple layers surrounding that core. Often, at least one of those surrounding layers will include steel wires or other metal strands so as to increase the cable tensile strength and so as to protect the optical fibers. The metal strand layer(s) may be covered in one or more layers of a plastic or other material to provide insulation and water proofing.

It is frequently necessary to terminate such a cable into a watertight structure that is also located underwater. Such structures could include pressure vessels or other containers that rest on the ocean floor. Those structures may contain equipment that must be connected to the optical fiber(s) in the terminated cable and/or that receive electrical power transmitted through the metal strands in the cable. In order to prevent water from entering the structure, a cable termination fitting is typically attached to the end of the cable. Such a device includes seals and other elements that allow the termination device to connect to the underwater structure in a watertight manner.

Conventionally, specific termination devices have been designed and manufactured for each cable type and/or size. Because cable termination devices can be relatively complex and may include numerous separate components, a common type of termination device usable on multiple types and/or sizes of cable would be desirable. Moreover, assembling conventional termination devices and attaching such devices to cables can be time consuming. For these and other reasons, there remains a need for improved electro-optical cable termination devices.

SUMMARY

This Summary is provided to introduce a selection of concepts in a simplified form that are further described below in the Detailed Description. This Summary is not intended to identify key or essential features of the invention.

In at least some embodiments, a cable termination device may include a cable termination device housing configured for water-tight attachment to vessel. The device may further include a load cup isolator. The load cup isolator may have a bore formed therein; the load cup isolator may be located at least partially within bore of the housing. The termination device may also include a load cup having a load cup bore formed therein. The load cup may be located at least partially within the load cup isolator bore and at least partially within the housing bore. The termination device may additionally include a load cup nut in contact with an end of the load cup. All parts of the load cup nut may be separated from the housing and conductive components in electrical communication with the housing by a nonconductive material. In certain embodiments, all parts of the load cup nut may be separated from the housing and conductive components in electrical communication with the housing by at least 0.10 inches of nonconductive material.

In at least some additional embodiments, a cable termination device assembly may include a cable termination device housing, a load cup isolator, a load cup and a load cup nut. A portion of the load cup isolator may surround an outer perimeter of the load cup nut.

In at least some further embodiments, a cable termination device may comprise one or more components that are generic to multiple types and/or sizes of cable. The device may further comprise one or more components that are specific to a particular cable type and/or size. The cable-generic components can be combined with cable-specific components applicable to the particular cable type and/or size so as to assemble a termination device attached to an end of a cable of that particular type and/or size. The cable-generic components could alternatively be combined with cable-specific components applicable to a different cable type and/or size so as to assemble a termination device attached to an end of a cable of that different type and/or size.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIG. 13A is a vessel end view of an electrical isolator from the cable termination device of FIGS. 1A and 1B; FIG. 13B is a cross-sectional view of that isolator.

FIG. 14A is a vessel end view of a belt seal from the cable termination device of FIGS. 1A and 1B; FIG. 14B is a cross-sectional view of that belt seal.

FIG. 15A is a vessel end view of another belt seal from the cable termination device of FIGS. 1A and 1B; FIG. 15B is a cross-sectional view of that belt seal.

FIG. 16A is a vessel end view of a belt centralizer from the cable termination device of FIGS. 1A and 1B; FIG. 16B is a side view of that belt centralizer.

FIG. 17A is a perspective vessel end view of a tail cone backing ring from the cable termination device of FIGS. 1A and 1B; FIGS. 17B through 17D are respective vessel end, cross-sectional and cable end views of that backing ring.

DETAILED DESCRIPTION

Figure 1A:
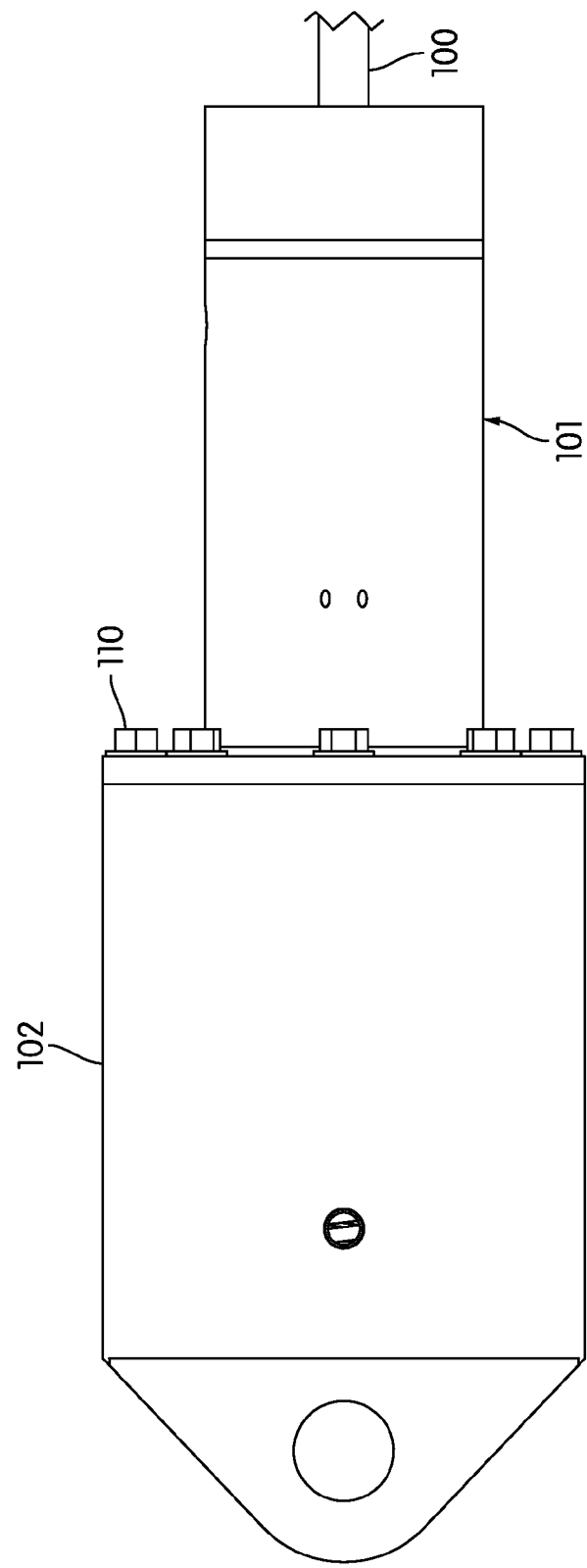
FIG. 1A is a side view of a covered cable termination device according to some embodiments.

FIG. 1A is a side view of a covered cable termination device according to at least some embodiments. Visible in FIG. 1A are a small portion of an electro-optical cable 100, a portion of a termination device 101 installed on an end of cable 100, and a storage cap 102 secured to termination device 101 with bolts 110.

Cable 100 may be, e.g., a telecommunication cable configured for deployment in an undersea environment. Designs for undersea telecommunication cables can vary widely. As is discussed below in further detail, termination device 101 can be modified to accommodate different cable types and/or sizes by substitution of certain internal components. For purposes of describing termination device 101, however, one example of such a cable design is provided. In particular, cable 100 might be a cable that includes an inner core of one or more optical fibers. Those fibers may be contained within a tube formed from polybutylene terephthalate (PBT) or other polymer. That tube might alternatively be formed from a metal or from another material or combination of materials. The fiber core may then be wrapped by one or more layers of steel wires, with that layer in turn wrapped in a copper sheath, and with the copper sheath layer in turn wrapped by a layer of insulation (e.g., medium density polyethylene). Individual layers of cable 100 may be sealed from one another so that a partial breach in an outer layer does not allow water incursion into inner layers.

Termination device 101 is configured for watertight attachment. Termination device 101 may be installed onto the end of cable 100 so that optical fibers within cable 100 can enter a sealed vessel in a watertight manner. The sealed vessel could be, e.g., a container configured to rest on the sea floor and withstand hydrostatic pressure associated with submersion to a particular depth. When storage cap 102 is removed, the portion of termination device 101 located within storage cap 102 in FIG. 1A can be placed into a corresponding opening in the vessel so as to form a watertight seal. Within the protection of that vessel, connections may then be made to the optical fiber(s) in the core of cable 100. Cable 100 may also be used to provide electrical power to devices within the container. For example, the steel wires in one or more layers of cable 100 may be configured as the positive lead of a DC power source. A metal external housing of a vessel to which device 101 is connected, which external housing would be in contact with seawater, could then be configured as the ground (negative lead) of that DC power source.

By way of convention, and unless the context requires otherwise, the end of termination device 101 where cable 100 enters device 101 will be referred to as the "cable" end. In FIG. 1A, the cable end is to the right. Similarly, the opposite end of device 101 will be referred to as the "vessel" end. The vessel end of device 101 is to the left and within cover 102 in FIG. 1A. A face, side or other aspect of a termination device 101 component that is oriented toward the cable end of device 101 in an assembled state will be referred to as a "cable" face, side or other aspect. A face, side or other aspect of a termination device 101 component that is oriented toward the vessel end of device 101 in an assembled state will be referred to as a "vessel" face, side or other aspect.

Figure 1B:
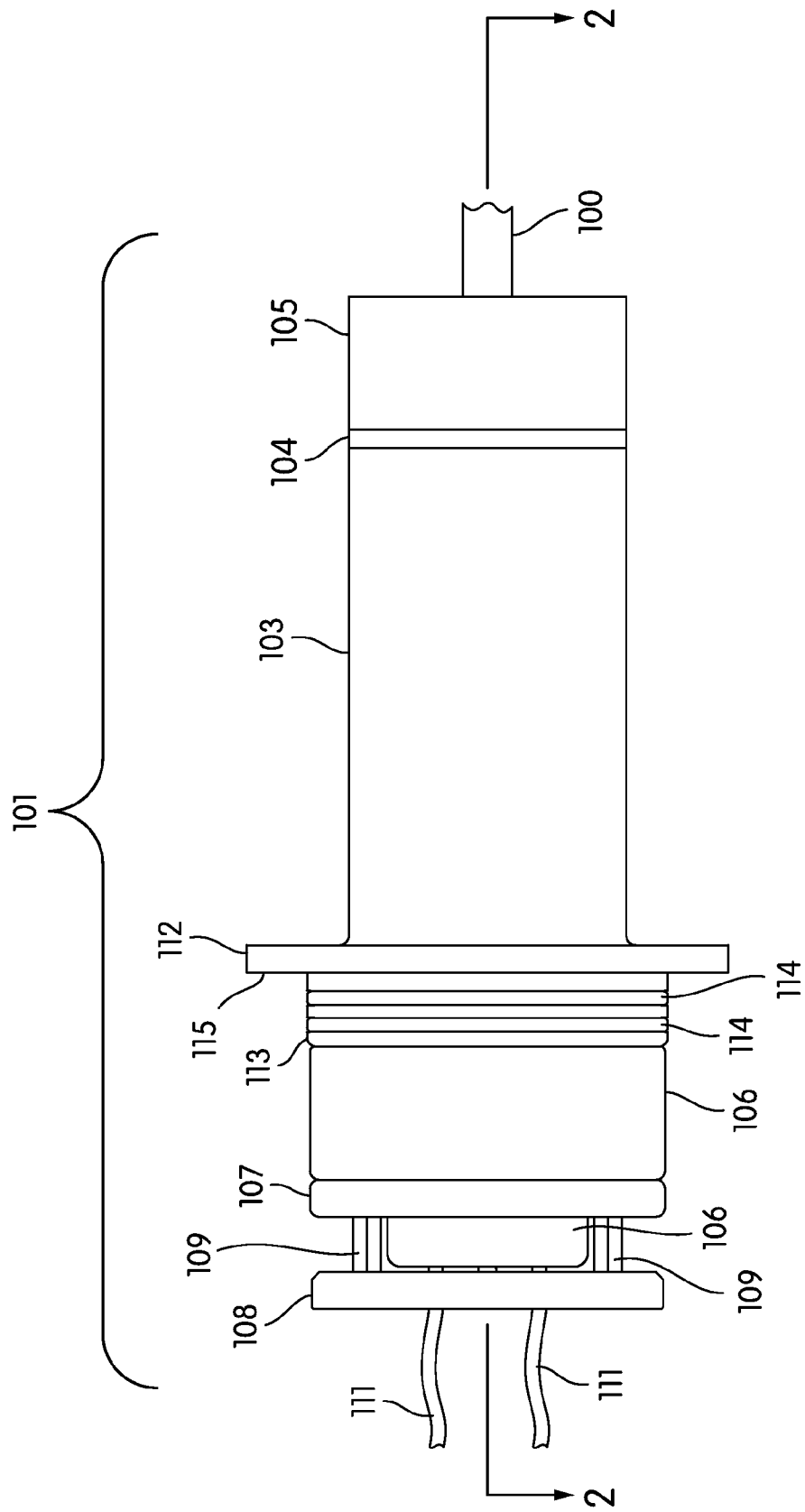
FIG. 1B is a side view of the cable termination device from FIG. 1A, but with a storage cap removed.

FIG. 1B is a side view of termination device 101 from FIG. 1A, but with storage cap 102 and bolts 110 removed. Termination device 101 includes a termination housing 103. Termination housing 103 provides structural support for attachment of device 101 to a vessel, as well as support for and/or containment of other device 101 components. Additional details of housing 103 are seen in and described in connection with FIGS. 2 and 10A through 10E.

Toward the cable end of housing 103, device 101 further includes a tail cone backing ring 104 and a tail cone collet retainer 105. Backing ring 104 serves to center cable 100 relative to housing 103. Collet retainer 105 holds a collet that also serves to secure cable 100. The collet is not seen in FIG. 1B but is described in connection with other drawing figures. Additional details of backing ring 104 are seen in and described in connection with FIGS. 2 and 17A through 17D. Additional details of collet retainer 105 are seen in and described in connection with FIGS. 2 and 18A through 18C.

Toward the vessel end of housing 103, device 101 includes a load cup nut isolator 106, a retaining ring 107 and a fiber transition disk 108. Additional details of these components are seen in and described in connection with subsequent drawing figures. The purposes of these components are also described below. A plurality of standoffs 109 couple disk 108 to retaining ring 107. Two high-voltage electrical wires 111 penetrate through openings in disk 108 and are connected to a termination load cup nut within isolator 106. The termination load cup nut is not shown in FIG. 1B but is shown and described in connection with subsequent figures.

Housing 103 includes a flange 112. Elements of device 101 on the vessel side of flange 112 are inserted into a vessel when assembly 101 is used to terminate cable 100 into that vessel. In particular, the vessel side of device 101 is inserted into a circular opening of a vessel, which opening would have a diameter slightly larger than the diameter of the vessel end 113 of housing 103. Isolator 106, retaining ring 107 and disk 108 have diameters that are the same or less than that of end 113 so as to also pass through the vessel opening. O-rings 114 in end 113 seal against the surface of the vessel opening so as to form a water-tight seal. A vessel-side face 115 of flange 112 would contact the vessel housing, and bolts similar to bolts 110 could be used to secure device 101 to the vessel.

Figure 2:
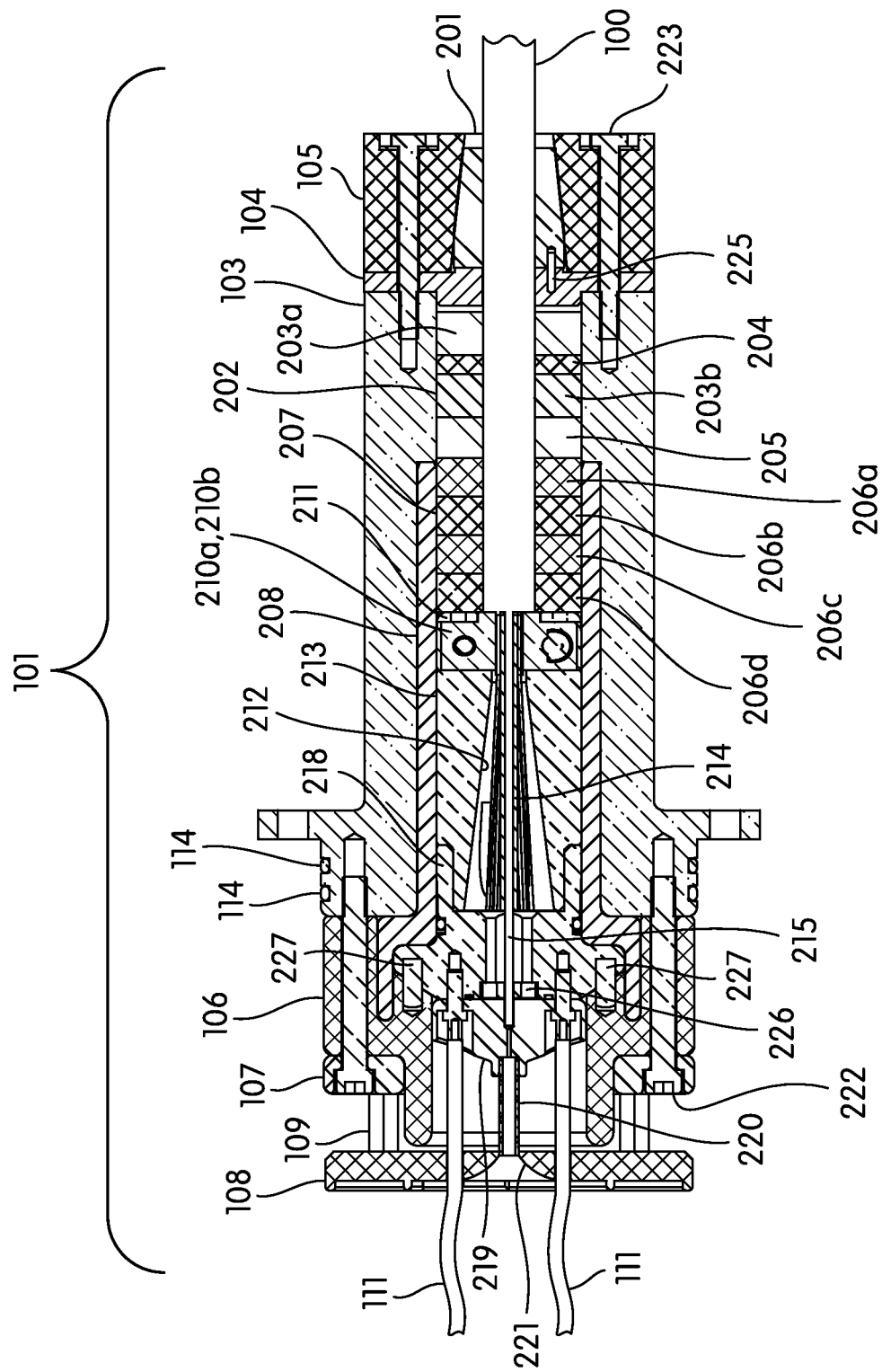
FIG. 2 is a cross-sectional view, taken from the location indicated in FIG. 1B, of the cable termination device of FIGS. 1A and 1B.

FIG. 2 is a cross-sectional view, taken from the location indicated in FIG. 1B, of cable termination device 101 and of a portion of cable 100. A part of the cable 100 portion in FIG. 2 on the cable side of collars 210a and 210b is not shown in cross-section so as to avoid obscuring the figure with unneeded detail. Similarly, electrical wires 111 are not shown in cross-section.

FIG. 2 shows internal components and other additional details of termination device 101, as well as the manner in which termination device 101 is attached to the end of cable 100. Cable 100 enters device 101 through a tail cone collet 201 nested within collet retainer 105. After passing through an opening in tail cone backing ring 104, cable 100 enters an internal bore 202 of housing 103 and passes through several components located within bore 202. In particular, and going from the cable end to the vessel end in FIG. 2, those components are a first silicone belt seal 203a, a belt centralizer 204, a second silicone belt seal 203b, a butyl belt seal 205, and four electrical isolators 206a-206d. Isolators 206a-206d rest within the bore 207 of a load cup isolator 208. A narrowed and elongated cable-side end of load cup isolator 208 rests within an enlarged portion of bore 202. Additional details of seals 203a and 203b, centralizer 204, seal 205 and isolators 206a-206d are described in connection with other drawing figures.

The portion of cable 100 on the vessel side of isolator 206d has its insulation and other outer layers (if any) removed so as to expose steel wires 214 surrounding the optical fiber core 215. As indicated above, the portion of cable 100 to the right of this removal is not shown in cross-section in FIG. 2. The exposed layers of cable 100 pass through a pair of split collars 210a and 210b, as well as through a split collar cap 211 surrounding collars 210a and 210b. As explained in further detail below, collars 210a and 210b clamp to cable 100.

The remaining layers of cable 100 pass from collars 210a and 210b into a frustoconical chamber of a bore 212 of a termination load cup 213. Load cup 213, additional details of which are described in conjunction with FIGS. 8A through 8D, provides a structure for attachment to the tensile load-bearing elements (e.g., steel wires 214) of cable 100. Termination load cup 213 also rests within bore 207 of isolator 208, as well as within bore 202 of housing 103. The steel wires 214 of cable 100 are splayed outward, cut at or near the vessel-side edge of load cup 213, and secured within the frustoconical chamber of bore 212 so as to form a potted connection between cable 100 and load cup 213. During assembly of device 101, and while steel wires 214 of cable 101 are splayed outward as shown in FIG. 2, epoxy is introduced into the frustoconical chamber of bore 212 and allowed to harden.

Optical fiber core 215 of cable 100 emerges from the termination side of load cup 213. Core 215 then passes through a termination load cup nut 218, a fiber tube centralizer 226 and conductor retainer 219. A section 220 of polypropylene tubing connects conductor retainer 219 and fiber transition disk 108. Fibers from core 215 pass through tubing 220 and opening 221 of disk 108.

Isolator 208, load cup nut 218 and load cup nut isolator 106 are held in place relative to housing 103 by retaining ring 107. Screws 222 pass through shouldered holes in retaining ring 107, through holes in isolator 106 and into threaded holes in the vessel end of housing 103. Screws 223 pass through shouldered openings in the cable side end of collet retainer 105, through openings in tail cone backing ring 104, and into threaded holes in housing 103 so as to secure retainer 105 and backing ring 104 to the cable end of housing 103. Additional components within termination assembly 101, as well as additional features of the components described thus far, are described below.

Isolators 206a-206d, load cup isolator 208, and load cup nut isolator 106 are formed from materials that are electrically non-conductive and serve to insulate certain conductive components of device 101 and cable 100 from other components of device 101 and from a vessel to which device 101 might be attached. Collars 210a and 210b, split collar cap 211, termination load cup 213 and termination load cup nut 218 are formed from conductive materials. Collars 210a and 210b are clamped to, and in electrical contact with, steel wires 214 of cable 100. Collars 210a and 210b are in electrical contact with load cup 213, and load cup 213 is in electrical contact with load cup nut 218. Wires 214, collars 210a and 210b, cap 211, load cup 213 and nut 218 are in electrical communication with one another, but are electrically insulated from housing 103 and from components in electrical communication with housing 103. When device 101 is installed in a vessel so as to terminate cable 100 to that vessel, wires 214, collars 210a and 210b, cap 211, load cup 213 and nut 218 are also isolated from portions of the vessel adjacent to the vessel side of housing 103. This allows use of steel wires 214 as a positive lead of a DC power source and use of a metal vessel housing (not shown) as the ground of that DC power source. Insulated high-voltage electrical wires 111, which pass through openings in disk 108 to connect with nut 218, can be used to connect components within the vessel to the positive lead.

FIGS. 3 through 20C show individual components of termination device 101. So as to provide additional detail, the views of various components in certain of FIGS. 3 through 20C are enlarged relative the manner in which those same components are depicted in FIG. 2. The degree of enlargement is not necessarily the same throughout FIGS. 3-20C. For example, comparing FIGS. 5A-5B with FIGS. 7A-7D would not correctly show the relative sizes of load cup nut isolator 106 and conductor retainer 219. The relative sizes of these components and of other individual device 101 components can be seen in FIG. 2, however.

Figure 3:
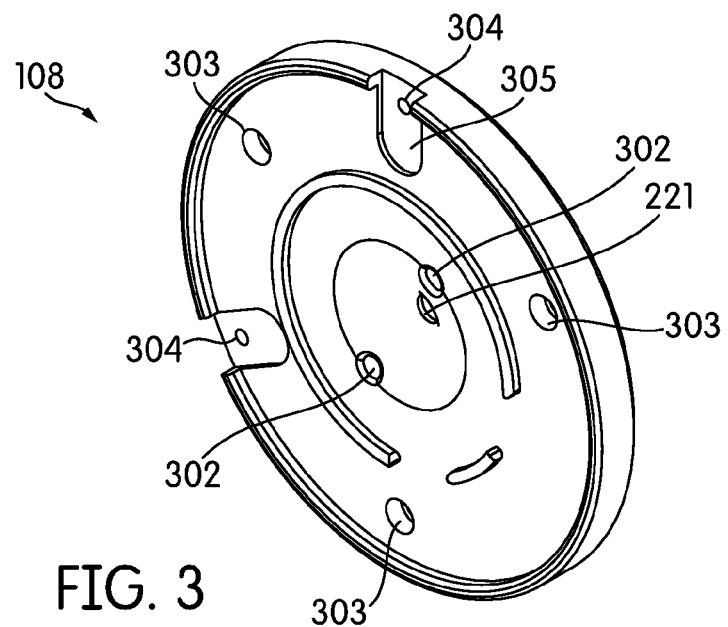
FIG. 3 is a vessel end view of a fiber transition disk from the cable termination device of FIGS. 1A and 1B.

FIG. 3 is a perspective vessel end view of fiber transition disk 108. In some embodiments, disk 108 may be machined or otherwise formed from homopolymer acetal (e.g., such as the material sold under the trade name DELRIN). Other materials or combinations of material could alternatively be used. Disk 108 provides a convenient post-termination location for access to optical fibers of cable 100. Those optical fibers pass through hole 221 in the center of disk 108. The edge of hole 221 is provided with a relatively large radius so as to avoid crimping or otherwise damaging optical fibers. Two holes 302 allow wires 111 to pass through disk 108. Three holes 303 allow for screws to pass through disk 108 and secure disk 108, via standoffs 109, to retaining ring 107. Two holes 304 can be used to attach tabs (not shown) that hold optical fibers emanating from hole 221. A recess 305 may be formed around each hole 304 to accommodate a tab. The cable side face of disk 108, not shown in FIG. 3, is substantially smooth except for holes 301-304. Corners and edges of disk 108 may have radii formed thereon.

Figures 4A, 4B:
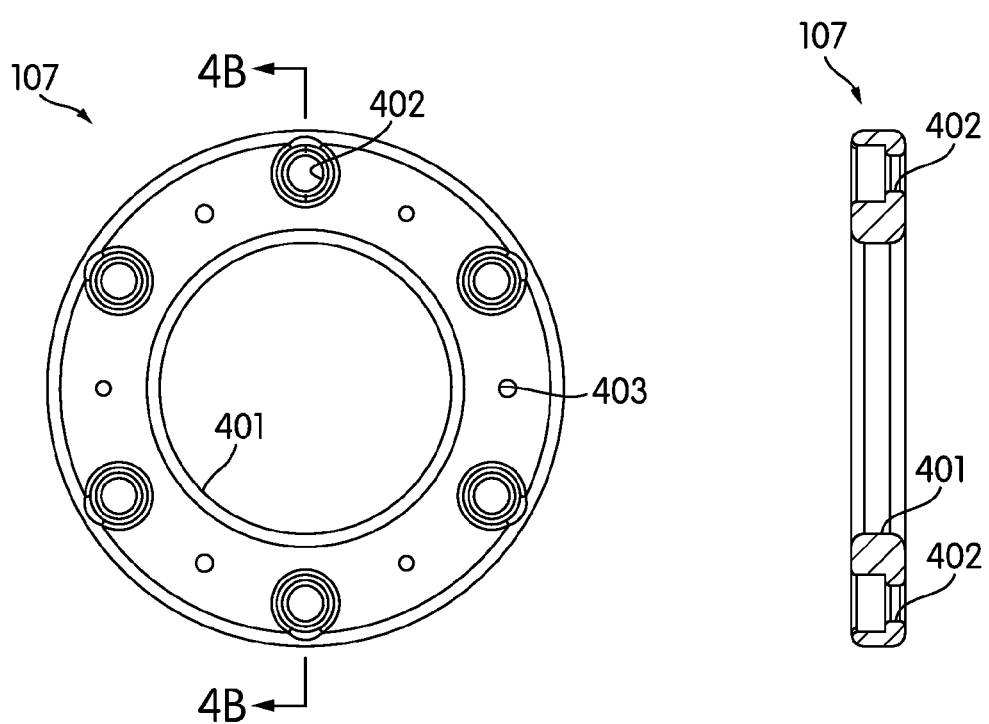
FIG. 4A is a vessel end view of a retaining ring from the cable termination device of FIGS. 1A and 1B.
FIG. 4B is cross-sectional view of that retaining ring.

FIG. 4A is a vessel end view of retaining ring 107. FIG. 4B is a cross-sectional view of retaining ring 107 from the location indicated in FIG. 4A. In some embodiments, retaining ring 107 can be machined or otherwise formed from carbon steel. Other materials or combinations of material could alternatively be used. A large central opening 401 is bored through retaining ring 107 to accommodate a vessel-side end of load cup nut isolator 106. Edges of opening 401 on the cable side and on the vessel side of retaining ring 107 may have radii formed thereon. Other corners and edges of retaining ring 107 may also have radii formed thereon. Six shouldered holes 402 pass through retaining ring 107 and are configured to accept bolts 222 (FIG. 2). Six threaded holes 403 are drilled through retaining ring 107 between holes 402. Three of holes 403 can be selected and receive a threaded end of a stand-off 109. The cable side face of retaining ring 107 surrounding opening 401, not shown in FIGS. 4A and 4B, is substantially smooth except for holes 402 and 403.

Figure 5A:
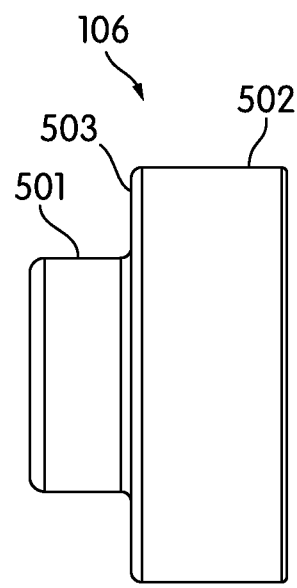
FIG. 5A is a side view of a load cup nut isolator from the cable termination device of FIGS. 1A and 1B.
Figure 5B:
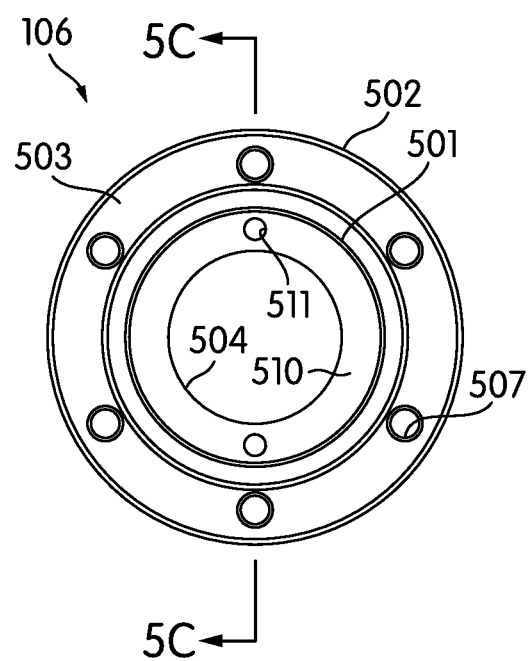
FIGS. 5B through 5D are vessel end, cross-sectional and perspective cable end views, respectively, of that load cup nut isolator.
Figure 5C:
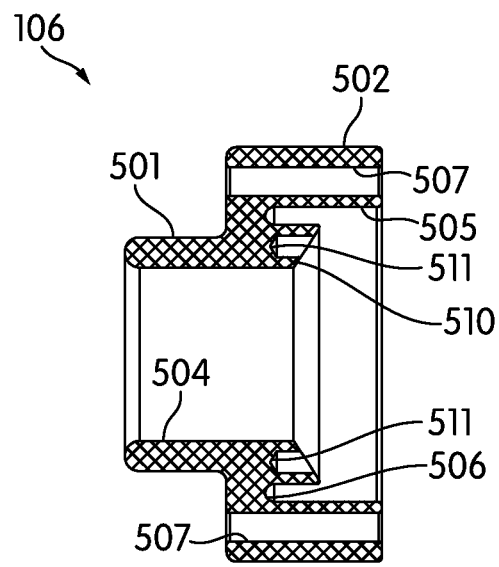
Figure 5D:
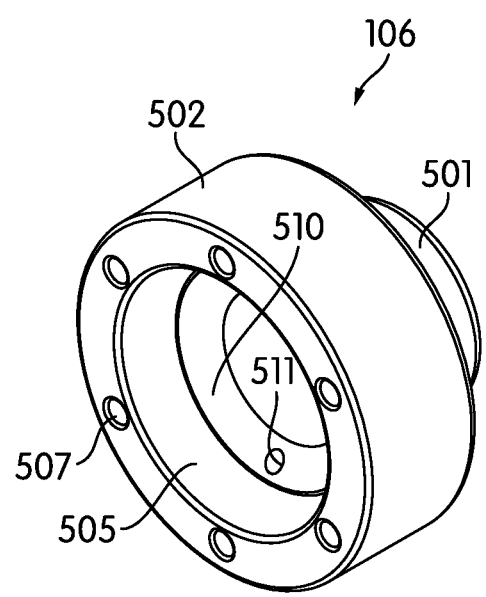

FIG. 5A is a side view of load cup nut isolator 106. FIG. 5B is a vessel end view of isolator 106. FIG. 5C is a cross-sectional view of isolator 106 from the location indicated in FIG. 5B. FIG. 5D is a perspective cable end view of isolator 106. In at least some embodiments, isolator 106 can be machined or otherwise formed from an amorphous polyetherimide material such as that sold under the trade name ULTEM 1000. Other materials or combinations of material could alternatively be used.

Isolator 106 includes a narrowed vessel-side portion 501 and a cable side portion 502. As seen by comparing FIGS. 2, 4B and 5C, portion 501 is configured to extend through opening 401 of retaining ring 107. A vessel-side face 503 of portion 502 serves as a seat for retaining ring 107. Main bore 504 extends through isolator 106 and includes an enlarged region 505 on the cable side of isolator 106. A circular groove 506 is formed in enlarged region 505. As also seen in FIG. 2, region 505 and groove 506 receive a vessel-side end of load cup isolator 208. Six holes 507 pass through portion 502 and accommodate screws 222 (shown in FIG. 2).

An interior frustoconical face 510 of isolator 106 has a slope corresponding to a slope on a vessel-side portion of termination load cup nut 218. Two holes 511 are formed in frustoconical face 510. Each of holes 511 accommodates a vessel-side end of an anti-rotation pin 227 (see FIG. 2), as is described in more detail below. Corners and edges of isolator 106 may have radii formed thereon.

Figure 6A:
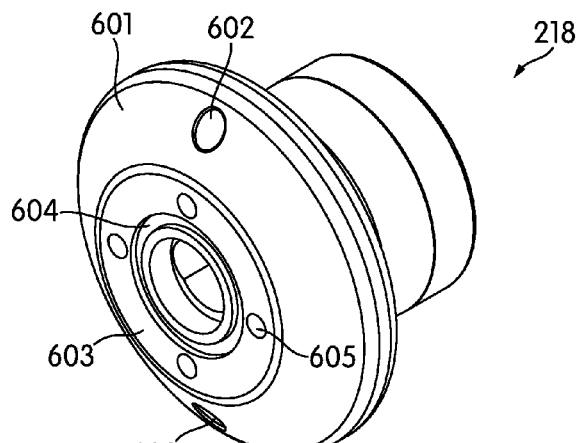
FIG. 6A is a perspective vessel end view of a termination load cup nut from the cable termination device of FIGS. 1A and 1B.
Figure 6B:
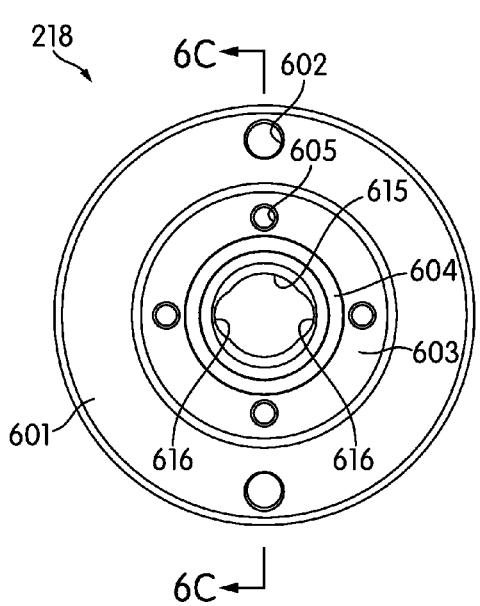
FIGS. 6B and 6C are vessel end and cross-sectional views, respectively, of that termination load cup nut.
Figure 6C:
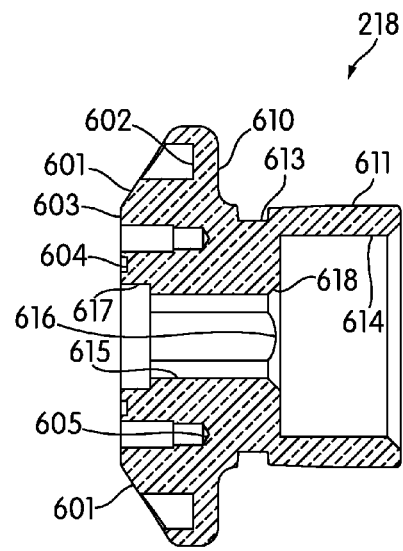

FIG. 6A is a perspective vessel end view of termination load cup nut 218. FIG. 6B is a vessel end view of load cup nut 218. FIG. 6C is a cross-sectional view of load cup nut 218 from the location indicated in FIG. 6B. In at least some embodiments, nut 218 may be machined or otherwise formed from brass (e.g., a free cutting brass). Other materials or combinations of material could alternatively be used. Termination load cup nut 218 prevents load cup 213 from moving toward the cable end of device 101 and provides a location for attachment of electrical connections to load cup 213.

A vessel-side frustoconical face 601 corresponds to frustoconical face 510 of isolator 106. In an assembled device 101, and as can be seen by comparing FIGS. 2, 5C and 6C, face 601 rests against face 510. Each of holes 602 drilled in face 601 accommodates a cable side end of an anti-rotation pin 227.

A center region face 603 is flattened and configured to abut a cable-side face of conductor retainer 219. A groove 604 is formed in face 603 and configured to accept an O-ring. Four threaded holes 605 are drilled into face 603 and configured to accept electrical terminals on the ends of wires 111.

A cable-side face 610 abuts a vessel-side surface of load cup isolator 208. A stud portion 611 of nut 218 rests within bore 207 of load cup isolator 208. A sealing groove 613 is formed in stud portion 611 around its entire outer circumference. In an assembled device 101, the vessel side of groove 613 holds a backing ring (formed from, e.g., nitrile rubber or other type of rubber) and the cable side of groove 613 holds an O-ring (formed from, e.g., an elastomeric material).

A main bore 615 extends through nut 218 and includes an enlarged region 614 on the cable side of isolator 218. In an assembled device 101, enlarged region 614 receives a vessel-side end of termination load cup 213. Two rounded grooves 616, the purpose of which is described below, are formed in the sides of bore 615. An enlarged opening 617 is formed around bore 615 on the vessel side so as to accommodate fiber tube centralizer 226. A chamfer 618 is formed in the edge of bore 615 that expands into opening 614. Corners and edges of nut 218 may have radii formed thereon.

Figure 7A:
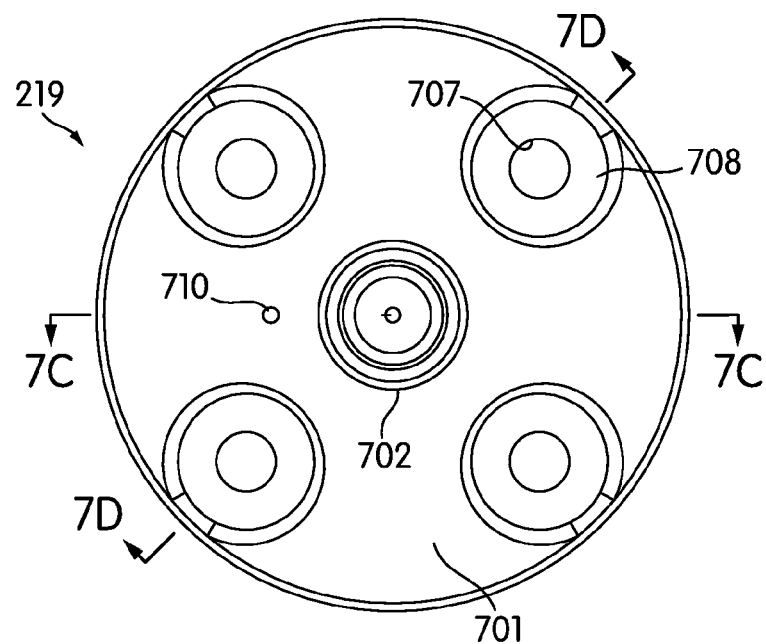
FIG. 7A is a vessel end view of a conductor retainer from the cable termination device of FIGS. 1A and 1B.
Figure 7B:
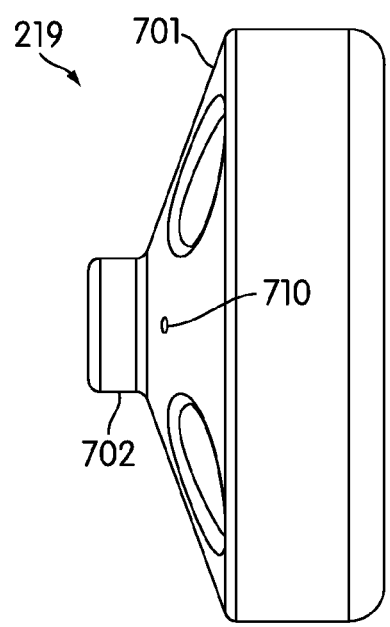
FIGS. 7B through 7D are side, first cross-sectional and second cross-sectional views, respectively, of that conductor retainer.
Figure 7C:
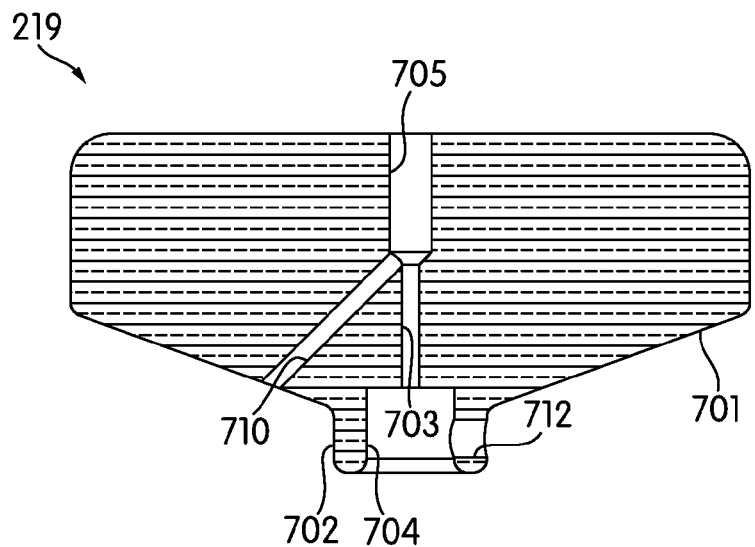
Figure 7D:
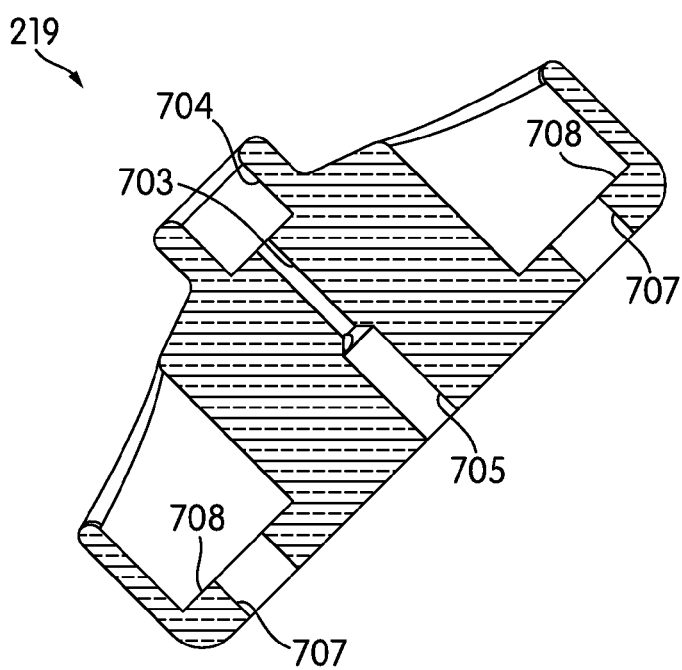

FIG. 7A is a vessel end view of conductor retainer 219. FIG. 7B is a side view of retainer 219. FIGS. 7C and 7D are first and second cross-sectional views of retainer 219 taken from the locations indicated in FIG. 7A. In at least some embodiments, retainer 219 may be machined or otherwise formed from bronze (e.g., a nickel aluminum bronze). Other materials or combinations of material could alternatively be used. A vessel-side face 701 slopes toward a nose 702. A bore 703 passes through retainer 219 and includes enlarged openings 704 and 705 on the vessel-side and cable-side ends, respectively. Enlarged opening 705 accommodates the tube surrounding the optical fibers of optical core 215. The optical fibers extend through bore 703 and opening 704. A second hole 710 penetrates face 701 and intersects bore 703 at the chamfered transition between enlarged opening 705 and the central portion of bore 703. Four holes 707 pass through retainer 219 at locations that are radially displaced from bore 703. Each of holes 707 includes an enlarged portion on the vessel side and a shoulder 708. Holes 707 permit passage of threaded ends of electrical terminals on wires 111 into holes 605 of nut 218. Shoulders 708 of holes 707 abut flanges on those wire terminals, thereby allowing those wire terminals to secure retainer 219 to nut 218. A hole 712 may be formed in the side of nose 702. Hole 712 may hold a set screw that secures tube 220 (see FIG. 2). Corners and edges of retainer 219 may have radii formed thereon.

Figure 8A:
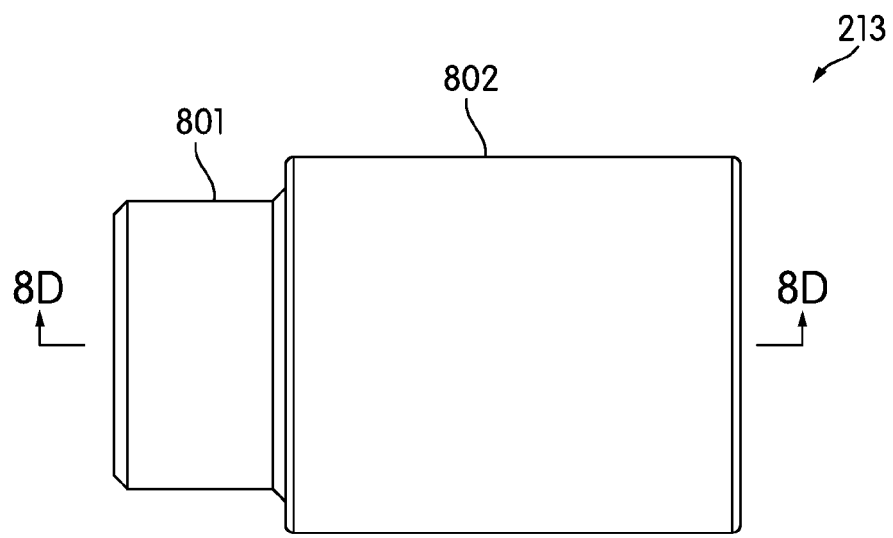
FIG. 8A is a side view of a termination load cup from the cable termination device of FIGS. 1A and 1B.
Figure 8B:
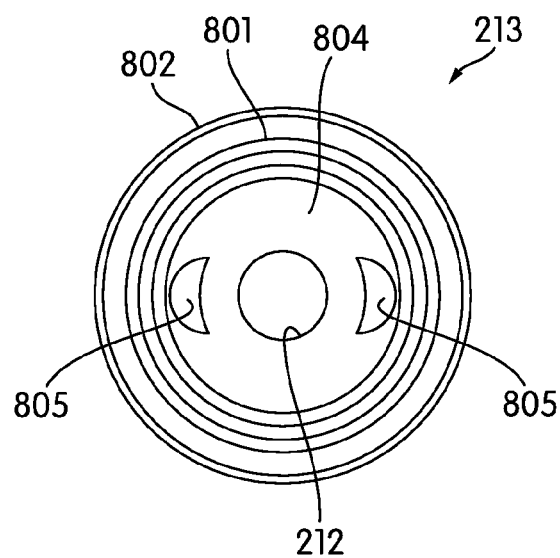
FIGS. 8B through 8D are vessel end, cable end and cross-sectional views, respectively, of that termination load cup.
Figure 8C:
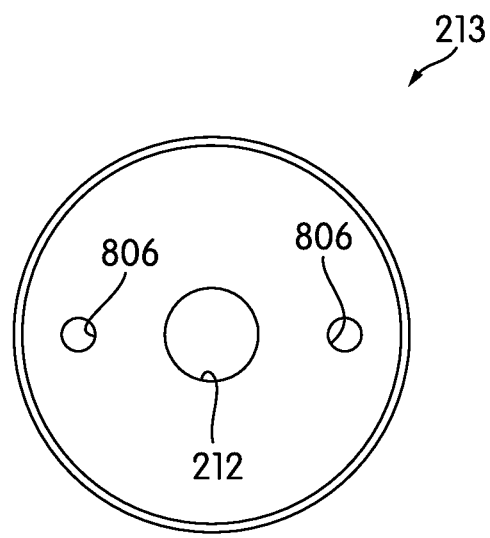
Figure 8D:
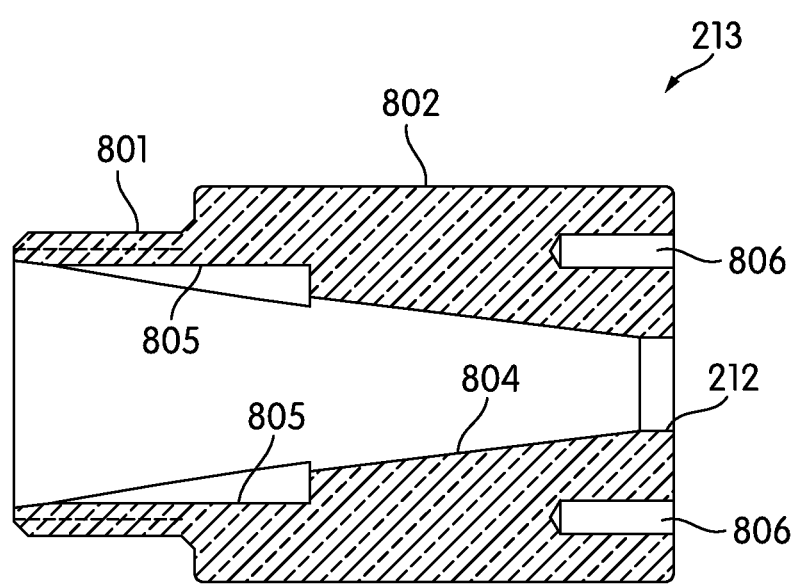

FIG. 8A is a side view of termination load cup 213. FIG. 8B is a vessel end view of load cup 213. FIG. 8C is a cable end view of load cup 213. FIG. 8D is a cross-sectional view of load cup 213 from the location indicated in FIG. 8A. In at least some embodiments, load cup 213 may be machined or otherwise formed from bronze (e.g., a nickel aluminum bronze). Other materials or combinations of material could alternatively be used.

Load cup 213 includes a reduced-diameter vessel-end portion 801 and a larger diameter main portion 802. In an assembled termination device 101, and as can be seen by comparing FIGS. 2, 5C and 8D, portion 801 rests within enlarged region 505 of load cup nut isolator 106. As further seen by comparing those figures, enlarged portion 802 contacts an inner surface of bore 207 of termination load cup isolator 213. A bore 212 passes longitudinally through load cup 213. The vessel side of bore 212 is enlarged to form a frustoconical chamber 804. As indicated above, a potted connection is formed between cable 100 and load cup 213. Chamber 804 receives the splayed steel wires 214 of cable 100 and epoxy resin to form that potted connection.

As seen in FIGS. 8B and 8D, two rounded channels 805 are formed in sides of chamber 804. During assembly, channels 805 are aligned with grooves 616 in bore 615 of load cup nut 218. When a potted connection between cable 100 and load cup 213 is formed, channels 805 and grooves 616 are also filled with epoxy resin. When the epoxy hardens, the resulting solid mass includes projections into channels 805 and grooves 616. These projections help prevent that solid mass from rotating relative to load cup 213 or load cup nut 218. In particular, and except for channels 805, chamber 804 is generally circular in cross-section along its longitudinal length. Similarly, bore 615 of load cup nut 218 is generally circular except for grooves 616. If the adhesive bond between the solidified epoxy of the potted connection and the walls of chamber 804 or bore 615 were to break free, and if channels 805 or grooves 616 were absent, the solidified epoxy mass could potentially rotate relative to chamber 804 and/or bore 615.

The cable end of load cup 213 includes two threaded holes 806. In an assembled device 101, holes 806 receive the threaded ends of screws that secure collars 210a and 210b to load cup 213. Corners and edges of load cup 213 may have radii formed thereon.

Figure 9A:
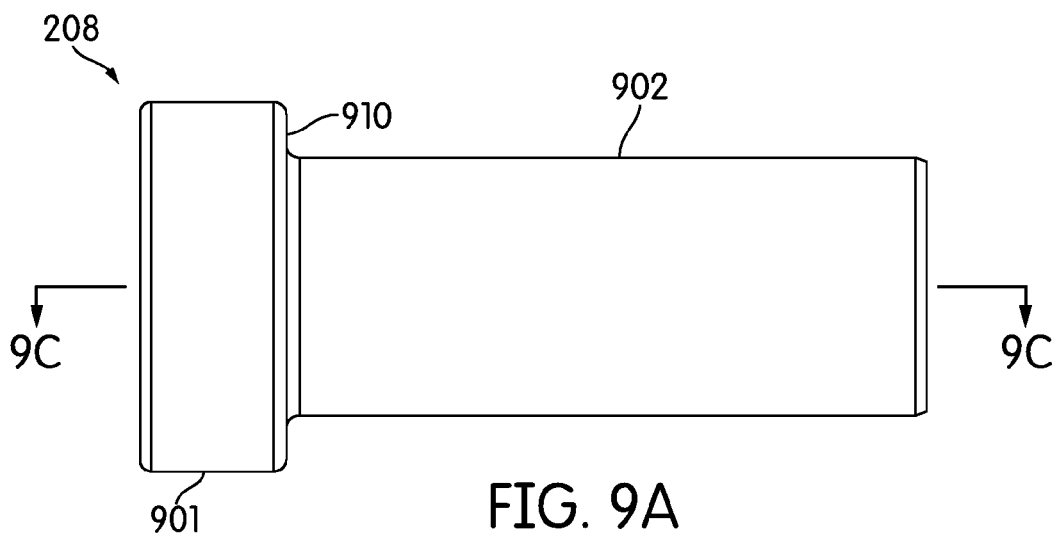
FIG. 9A is a side view of a load cup isolator from the cable termination device of FIGS. 1A and 1B.
Figure 9B:
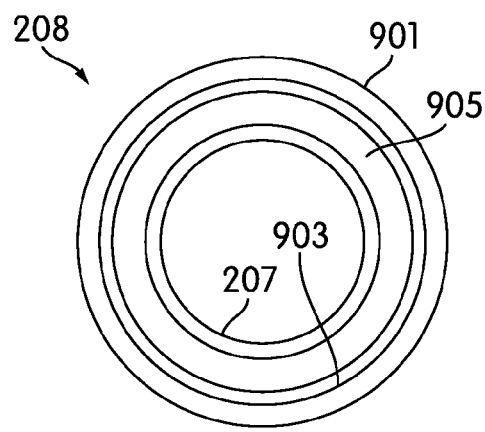
FIGS. 9B and 9C are respective vessel end and cross-sectional views of that load cup isolator.
Figure 9C:
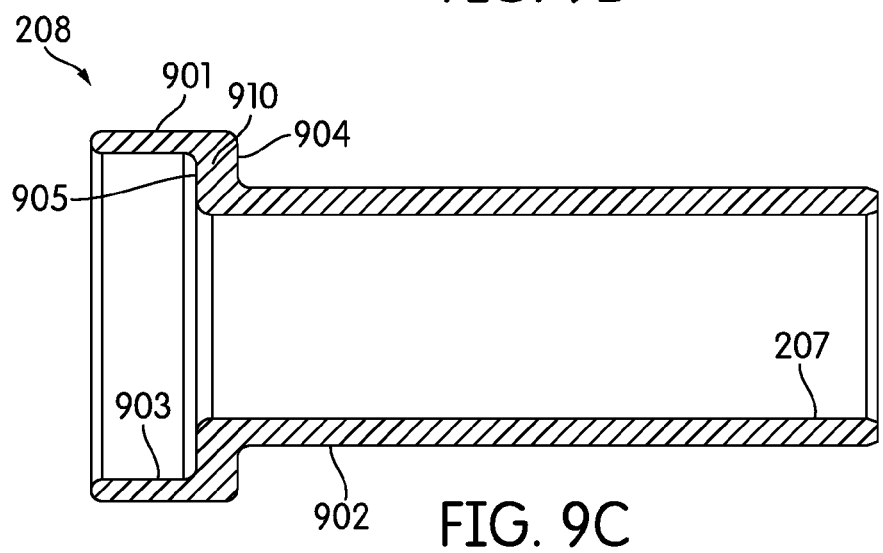

FIG. 9A is a side view of load cup isolator 208. FIG. 9B is a vessel end view of load cup isolator 208. FIG. 9C is a cross-sectional view of load cup isolator 208 taken from the location indicated in FIG. 9A. In at least some embodiments, isolator 208 can be machined or otherwise formed from an amorphous polyetherimide material such as that sold under the trade name ULTEM 1000. Other materials or combinations of material could alternatively be used.

Isolator 208 includes a reduced diameter main sleeve 902 and a larger diameter offset sleeve 901. A flange portion 910 connects offset sleeve 901 and main sleeve 902. Bore 207 includes an enlarged vessel-end opening 903 within offset sleeve 901. A vessel side face of flange portion 910 forms a shoulder 905. In an assembled device 101, and as can be seen by comparing FIGS. 2, 6C and 9C, shoulder 905 abuts face 610 of load cup nut 218. A cable-side face 904 of flange portion 910 abuts a vessel end of termination housing 103 in an assembled device 101. Corners and edges of isolator 208 may have radii formed thereon.

Figure 10A:
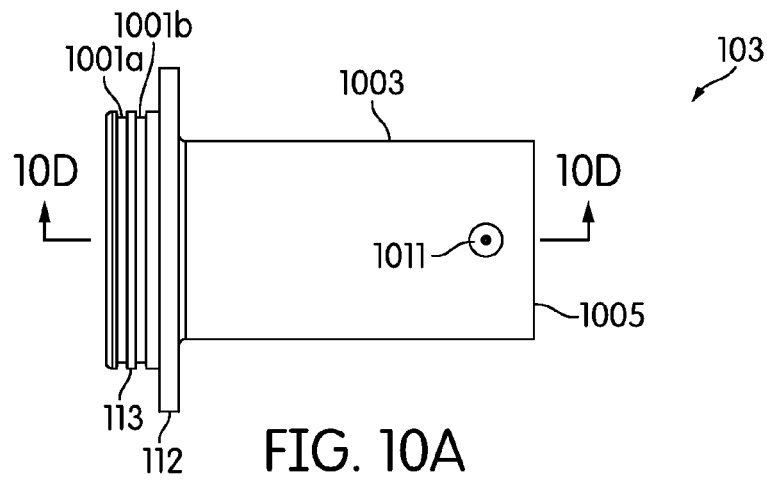
FIG. 10A is a side view of a termination housing from the cable termination device of FIGS. 1A and 1B.
Figure 10B:
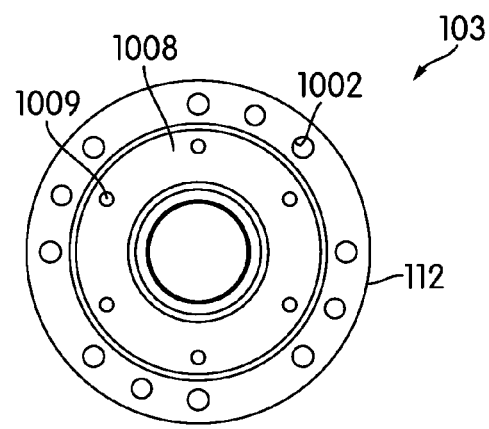
FIGS. 10B through 10E are respective vessel end, cable end, cross-sectional and perspective cable end views of that termination housing.
Figure 10C:
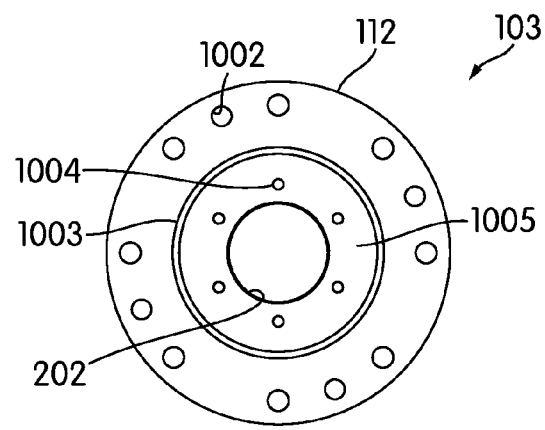
Figure 10D:
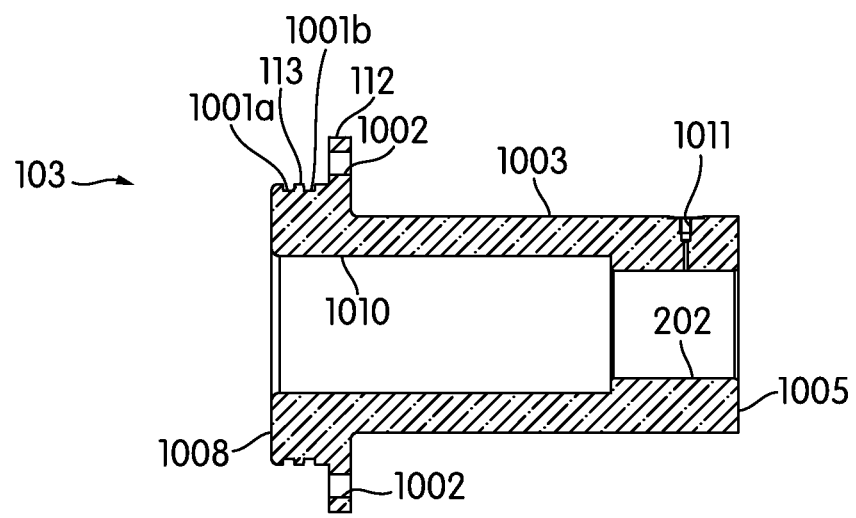
Figure 10E:
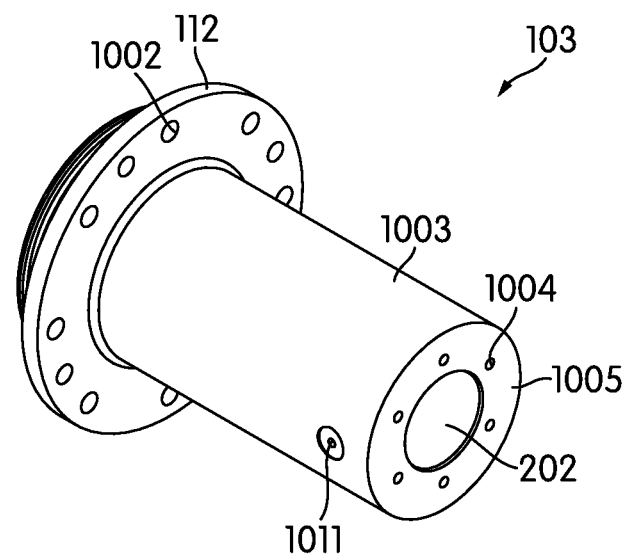

FIG. 10A is a side view of termination housing 103. FIGS. 10B and 10C are respective vessel end and cable end views of housing 103. FIG. 10D is a cross-sectional view of housing 103 from the location indicated in FIG. 10A. FIG. 10E is a perspective cable end view of housing 103. In at least some embodiments, termination housing 103 may be machined or otherwise formed from titanium. Other materials or combinations of material could alternatively be used.

Termination housing 103 includes a reduced diameter main portion 1003 and an enlarged diameter vessel-end portion 113. As previously indicated, O-ring grooves 1001a and 1001b are formed in vessel-end portion 113. Twelve holes 1002 are formed in flange 112 to accommodate bolts to secure housing 103 (and device 101) to a vessel or to cap 102 (FIG. 1A). Six threaded holes 1009 are formed in a vessel-end face 1008 of portion 1003. In an assembled device 101, holes 1009 receive screws 222 (FIG. 2) that secure retaining ring 107 and load cup nut isolator 106 to housing 103. Six threaded holes 1004 are formed in a cable-end face 1005 of main portion 1003. In an assembled device 101, holes 1004 receive screws 223 (FIG. 2) that secure tail cone collet retainer 105 and tail cone backing ring 104 to housing 103. As also seen in FIG. 2, a cable-end portion of bore 202 holds isolators 206a-206d in an assembled device 101. An enlarged diameter portion 1010 of bore 202 holds main sleeve 902 of load cup isolator 208, with main sleeve 902 holding stud portion 611 of termination load cup nut 218, termination load cup 213, collars 210a and 210b and split collar cap 211. A radially-oriented threaded hole 1011 is formed in main portion 1003 and intersects the narrower diameter cable-end portion of bore 202. A threaded fitting (not shown) of a pump or pump hose can be placed into hole 1011 for test purposes, as described below. Corners and edges of housing 103 may have radii formed thereon.

Figure 11A:
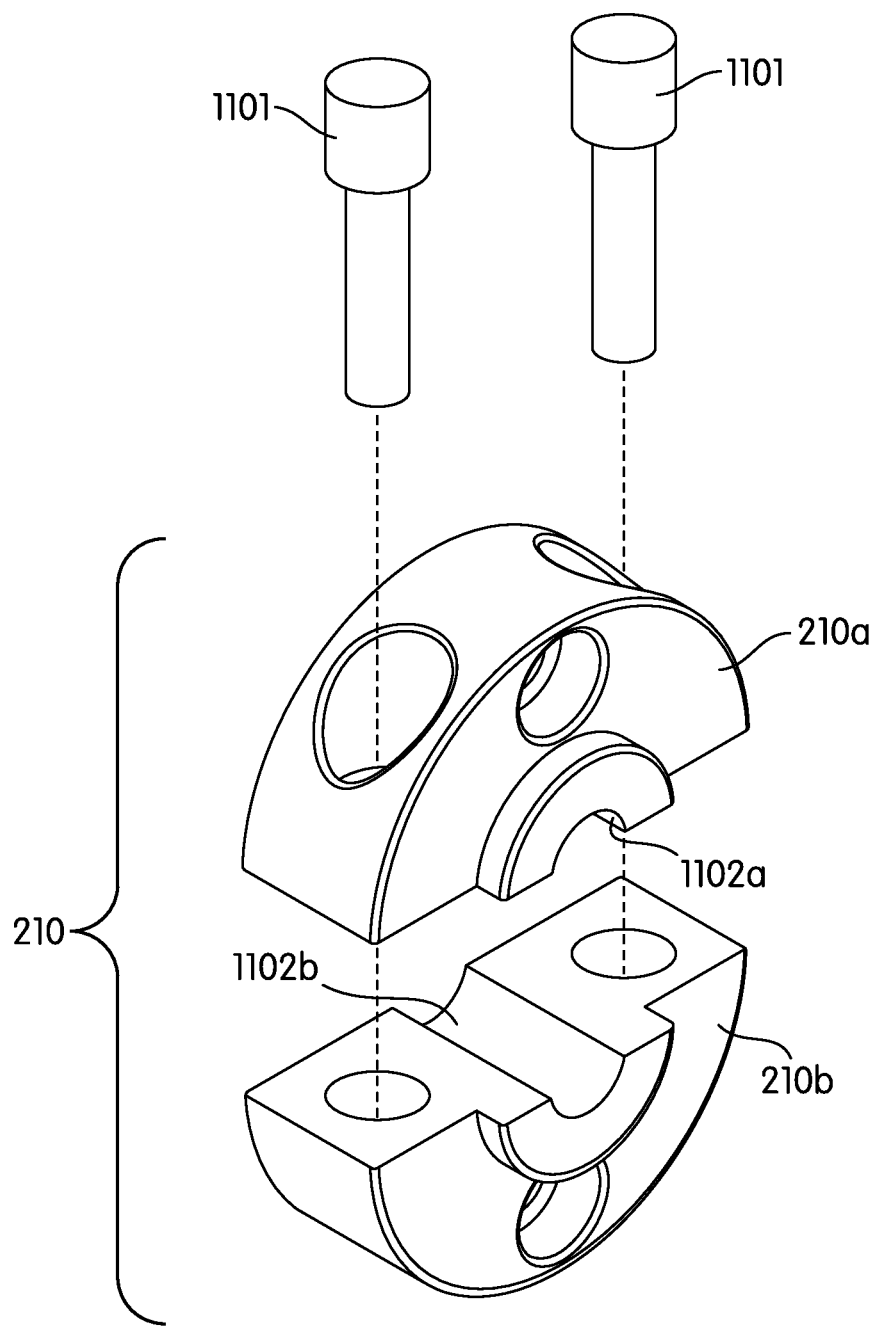
FIG. 11A is a perspective cable end view of an upper split collar and a lower split collar from the cable termination device of FIGS. 1A and 1B.
Figure 11D:
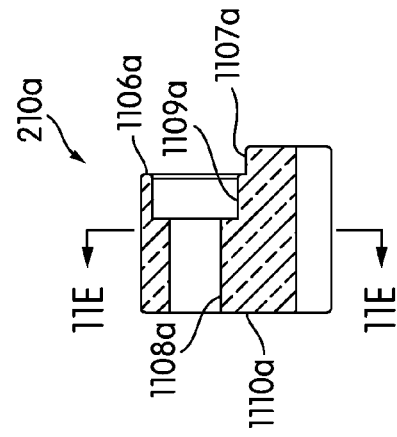
FIGS. 11B through 11E are respective cable end, bottom, first cross-sectional and second cross-sectional views of the upper split collar of FIG. 11A.
Figure 11E:
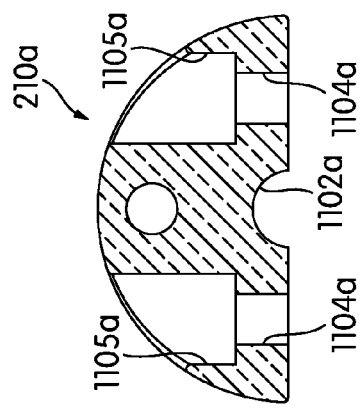
Figure 11B:
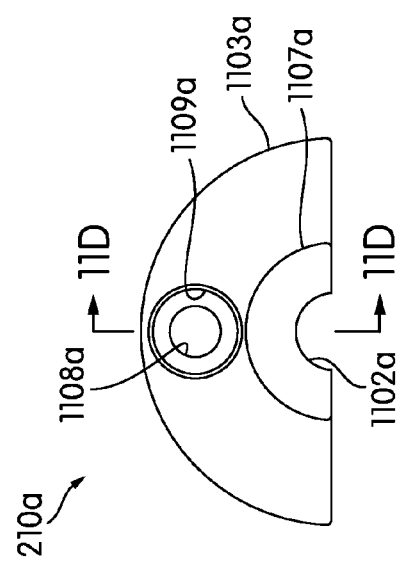
Figure 11C:
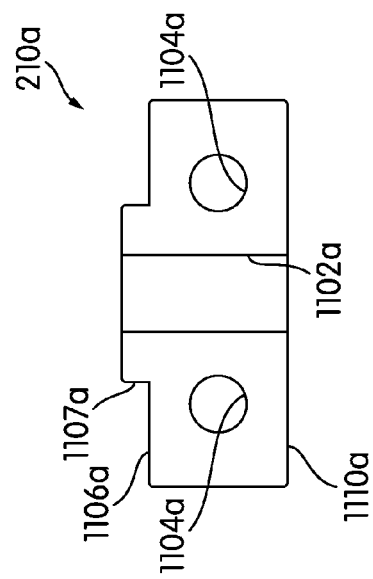
Figure 11F:
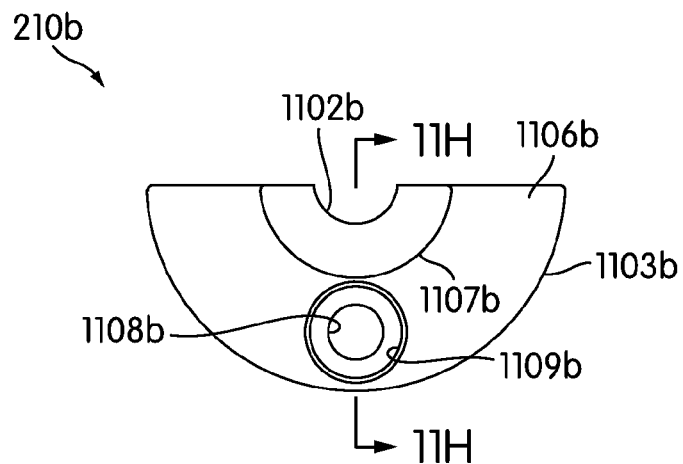
FIGS. 11F through 11H are respective cable end, top and cross-sectional views of the lower split collar of FIG. 11A.
Figure 11G:
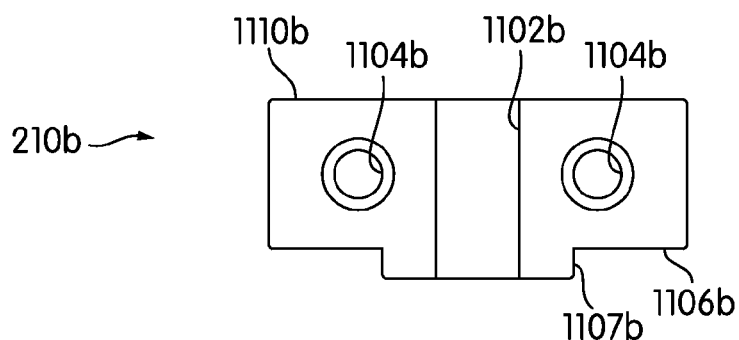
Figure 11H:
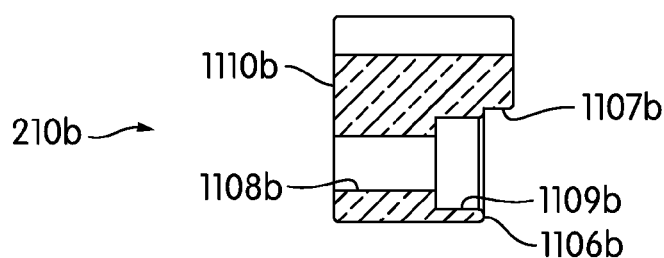

FIG. 11A is a perspective cable end view of upper split collar 210a and of lower split collar 210b in a separated condition. In an assembled device 101, collars 210a and 210b are joined together with screws 1101 and so as to form a collar 210 that clamps onto the steel wires 214 of cable 100. In the clamped configuration, steel wires 214 rest within a cavity 1102a of upper collar 210a and a cavity 1102b of lower collar 210b and contact the inner wall surfaces of cavities 1102a and 1102b. FIG. 11B is a cable end view of upper collar 210a. FIG. 11C is a bottom view of upper collar 210a. FIG. 11D is a cross-sectional view of upper collar 210a from the location indicated in FIG. 11B. FIG. 11E is a cross-sectional view of upper collar 210a from the location indicated in FIG. 11D. FIG. 11F is a cable end view of lower collar 210b. FIG. 11G is a top view of lower collar 210b. FIG. 11H is a cross-sectional view of lower collar 210b from the location indicated in FIG. 11F. In at least some embodiments, each of collars 210a and 210b may be machined or otherwise formed from bronze (e.g., an aluminum bronze). Other materials or combinations of material could alternatively be used.

Turning first to FIGS. 11B-11E, upper collar 210a has a semicircular outer face 1103a that is sized to fit within one half of an inner circumferential surface of split collar 211. Two shouldered holes 1104a are formed in upper collar 210a. Each of holes 1104a includes an enlarged opening 1105a that accommodates a head of one of bolts 1101. A cable-side face 1106a of upper collar 210a includes a nose 1107a. A shouldered hole 1108a extends through face 1106a to a vessel-side face 1110a. An enlarged opening 1109a in the cable end of hole 1108a accommodates the head of a bolt (not shown) used to secure upper collar 210a to load cup 213; the threaded end of that bolt is received in one of holes 806 in the cable end of load cup 213 (FIG. 8C).

Turning next to FIGS. 11F-11H, lower collar 210b also has a semicircular outer face 1103b that is sized to fit within another half of the inner circumferential surface of split collar 211. Two threaded holes 1104b are formed in lower collar 210b. Each of holes 1104b receives the threaded portion of one of bolts 1101. A cable-side face 1106b of lower collar 210b includes a nose 1107b. A shouldered hole 1108b extends through face 1106b to a vessel-side face 1110b. An enlarged opening 1109b in the cable end of hole 1108b accommodates the head of a bolt (not shown) used to secure lower collar 210b to load cup 213; the threaded end of that bolt is received in the other of holes 806 in the cable end of load cup 213 (FIG. 8C). Corners and edges of collars 210a and 210b may have radii formed thereon.

Figure 12A:
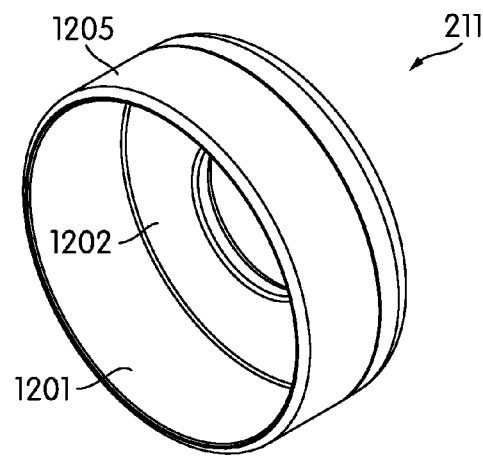
FIG. 12A is a perspective vessel end view of a split collar cap from the cable termination device of FIGS. 1A and 1B.
Figure 12B:
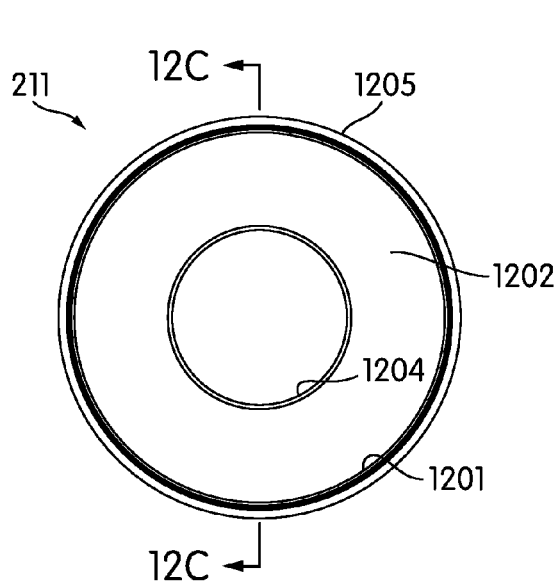
FIGS. 12B and 12C are respective vessel end and cross-sectional views of that cap.
Figure 12C:
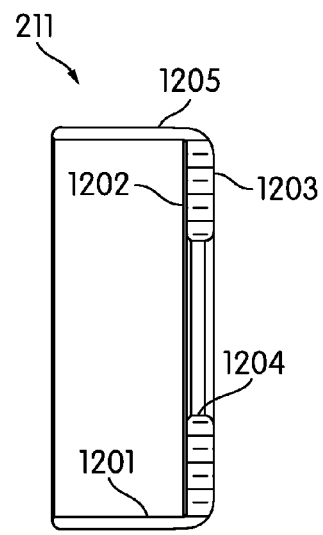

FIG. 12A is a perspective vessel end view of split collar cap 211. FIG. 12B is a vessel end view of split collar cap 211. FIG. 12C is a cross-sectional view of split collar cap 211 taken from the location indicated in FIG. 12B. In at least some embodiments, split collar cap 211 may be machined or otherwise formed from brass (e.g., a free cutting brass). Other materials or combinations of material could alternatively be used.

Split collar cap 211 fits over collar 210 after upper collar 210a and lower collar 21b have been clamped together on steel wires 214. Cap 211 is open on the vessel side and is partially closed on the cable side by an annular wall 1203. An inner cavity of cap 211 is bounded by a circumferential surface 1201 and an inner cable-side face 1202 of wall 1203. An opening 1204 is formed in wall 1203. In an assembled device 101, noses 1107a and 1107b of collars 210a and 210b extend through opening 1204. Surface 1201 of the internal cavity of cap 211 may be sized to closely fit faces 1103a and 1103b of collars 210a and 210b in an assembled device 101. Face 1202 of the cap 211 internal cavity contacts faces 1106a and 1106b of collars 210a and 210b. Face 1205 of cap 211 fits within bore 207 of isolator 208. Corners and edges of cap 211 may have radii formed thereon.

FIG. 13A is a vessel end view of electrical isolator 206a. FIG. 13B is a cross-sectional view of isolator 206a taken from the location indicated in FIG. 13A. In at least some embodiments, isolator 206a is machined or otherwise formed from homopolymer acetal (e.g., such as the material sold under the trade name DELRIN) or from copolymer acetal. Other materials or combinations of material could alternatively be used. Isolator 206a may be annular in shape and include a circular outer face 1301 that rests within bore 207 of isolator 208. Vessel side face 1303 and cable side face 1304 are flat. A bore 1302 extends through isolator 206a. Isolators 206b-206d may be identical to isolator 206a.

FIG. 14A is a vessel end view of belt seal 205. FIG. 14B is a cross-sectional view of belt seal 205 taken from the location indicated in FIG. 14A. In at least some embodiments, belt seal 205 is machined or otherwise formed from molded chlorobutyl. Other materials or combinations of material could alternatively be used. Belt seal 205 may be annular in shape and include a circular outer face 1401 that rests within bore 202 of housing 103. Vessel side face 1403 and cable side face 1404 are flat. A bore 1402 extends through belt seal 205. Corners and edges of belt seal 205 may have radii formed thereon.

FIG. 15A is a vessel end view of belt seal 203a. FIG. 15B is a cross-sectional view of belt seal 203a taken from the location indicated in FIG. 15A. In at least some embodiments, belt seal 203a is molded or otherwise formed from rubber (e.g., silicone rubber). Other materials or combinations of material could alternatively be used. Belt seal 203a may be annular in shape and include a circular outer face 1501 that rests within bore 202 of housing 103. Vessel side face 1503 and cable side face 1504 may be flat. A bore 1502 extends through belt seal 205. Corners and edges of belt seal 203a may have radii formed thereon. Belt seal 203b may be identical to belt seal 203a.

FIG. 16A is a vessel end view of belt centralizer 204, which helps to support cable 100 within the center of bore 202 of housing 103. FIG. 16B is a side view of belt centralizer 204. In at least some embodiments, belt centralizer 204 is machined or otherwise formed from homopolymer acetal (e.g., such as the material sold under the trade name DELRIN) or from copolymer acetal. Other materials or combinations of material could alternatively be used. Belt centralizer 204 may be annular in shape and include a circular outer face 1601 that rests within bore 202 of housing 103. Vessel side face 1603 and cable side face 1604 may be flat. A bore 1602 extends through belt centralizer 204. Corners and edges of belt centralizer 204 may have radii formed thereon.

FIG. 17A is a perspective vessel end view of tail cone backing ring 104. FIG. 17B is a vessel end view of backing ring 104. FIG. 17C is a cross-sectional view of backing ring 104 taken from the location indicated in FIG. 17B. FIG. 17D is a cable end view of backing ring 104. In at least some embodiments, backing ring 104 is machined or otherwise formed from titanium. Other materials or combinations of material could alternatively be used.

Backing ring 104 has a circular outer face 1701, a flat vessel side face 1702 and a flat cable side face 1703. A first circular nose 1704 extends from face 1702 and has diameter corresponding to that of bore 202 in housing 103. A second circular nose 1705 extends from face 1703 and has a diameter corresponding to a vessel side opening of tail cone collet retainer 105. A bore 1706 extends through backing ring 104 and is sized to accommodate the outer diameter of cable 100. Six holes 1707 are also formed in backing ring 104 to accommodate screws 223 (FIG. 2). Corners and edges of backing ring 104 may have radii formed.

As seen in FIG. 17D, a hole 1708 is formed in a flat face 1709 of nose 1705 in a location that is radially offset from bore 1706. As seen in FIG. 2, hole 1708 accepts a vessel end of an anti-rotation pin 225. A cable end of pin 225 is received in a hole formed in tail cone collet 201. Pin 225 may be, e.g., a commercially-available roll pin. In an assembled device 101, pin 225 helps to prevent rotation of tail cone collet 201 relative to backing ring 104. As explained below, collet 201 is compressed in an assembled device 101 and tends to clamp to cable 100. As seen in FIG. 2, backing ring 104 is bolted to the cable end of housing 103. Thus, preventing rotation of collet 201 relative to backing ring 104 also tends to prevent rotation of cable 100 relative to housing 103 and other device 101 components.

Figure 18A:
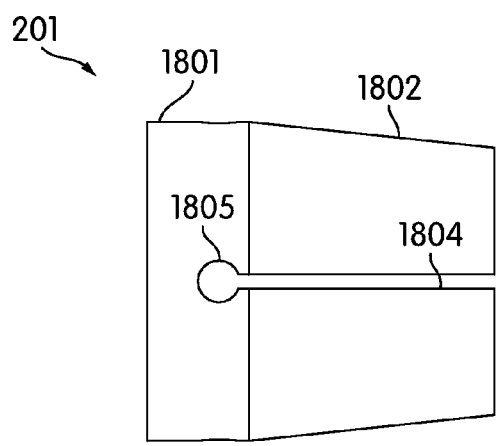
FIG. 18A is a side view of a tail cone collet from the cable termination device of FIGS. 1A and 1B.
Figure 18B:
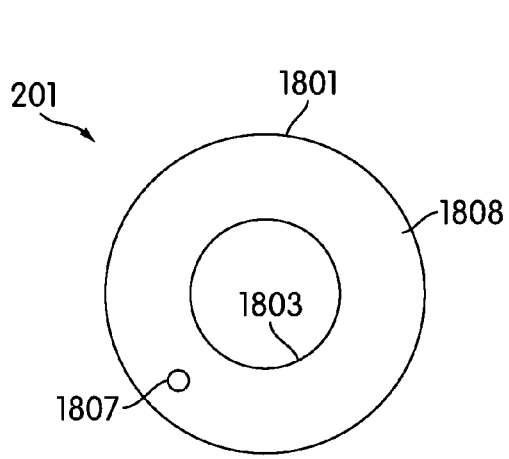
FIGS. 18B and 18C are respective vessel end and cable end views of that collet.
Figure 18C:
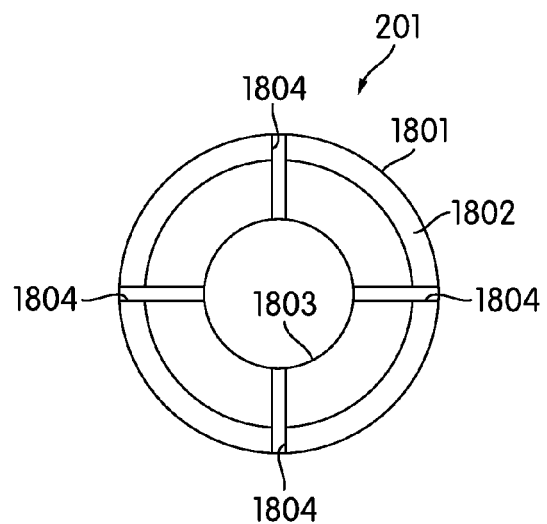

FIG. 18A is a side view of tail cone collet 201. FIGS. 18B and 18C are respective vessel end and cable end views of collet 201. In at least some embodiments, collet 201 is machined or otherwise formed from ultra high molecular weight polyethylene. Other materials or combinations of material could alternatively be used. Corners and edges of collet 201 may have radii formed thereon.

Collet 201 includes a cylindrical vessel-side portion 1801 and a frustoconical cable-side portion 1802. A bore 1803 extends through collet 201 and is sized to accommodate cable 100. Four slots 1804 are cut in the sides of collet 201, with each of slots 1804 terminating at a radial hole 1805 that intersects bore 1803. Only one hole 1805 is shown in FIG. 18A, but each of the other slots 1804 includes a similar hole 1805. The four slots 1804 create four finger-like quadrants of collet 201 that compress inward toward the centerline of bore 1803 when pressure is applied to the external face of portion 1802. Such pressure is applied when collet 201 is forced into a frustoconical portion of a bore in tail cone collet retainer 105 as retainer 105 is bolted to housing 103 (FIG. 2). The inward compression of the collet 201 quadrants thereby tends to clamp cable 100.

A hole 1807 is formed in a vessel-side face 1808 of collet 201 to accommodate anti-rotation pin 225 (FIG. 2). As indicated above, pin 225 helps to prevent rotation of cable 100 relative to device 101.

Figure 19A:
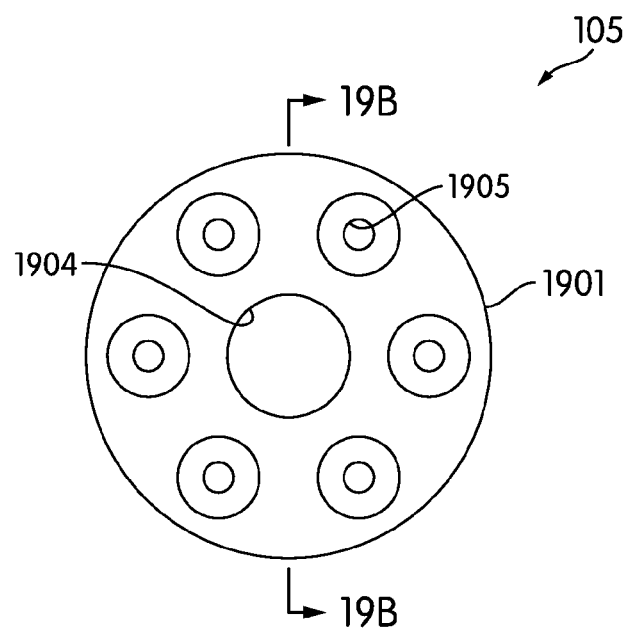
FIG. 19A is a cable end view of a tail cone collet retainer from the cable termination device of FIGS. 1A and 1B.
Figure 19B:
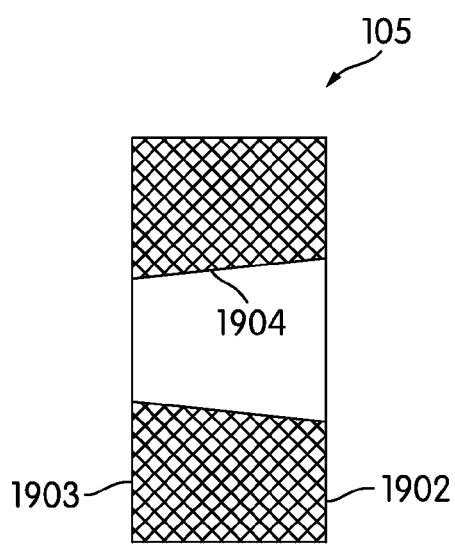
FIG. 19B is a cross-sectional view of that collet retainer.

FIG. 19A is a cable end view of tail cone collet retainer 105. FIG. 19B is a cross-sectional view of collet retainer 105 from the location indicated in FIG. 19B. In at least some embodiments, collet retainer 105 is machined or otherwise formed from 30% glass filled nylon (nylon resin with 30% glass fibers by volume). Other materials or combinations of material could alternatively be used. Collet retainer 105 has a circular outer face 1901, a flat cable-side face 1902 and a flat vessel-side face 1903. A frustoconical bore 1904 extends through collet retainer 105, with the smaller end of bore 1904 located on the cable side. Six shouldered holes 1905 are formed in collet retainer 105 to accommodate bolts 223 (FIG. 2). Corners and edges of tail cone collet retainer 105 may have radii formed thereon.

Figure 20A:
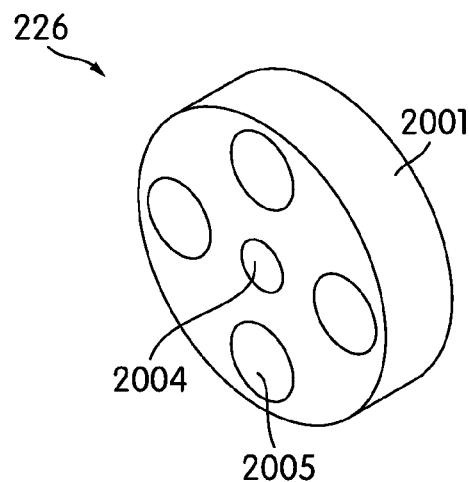
FIG. 20A is a perspective vessel-end view of a fiber tube centralizer from the cable termination device of FIGS. 1A and 1B.
Figure 20B:
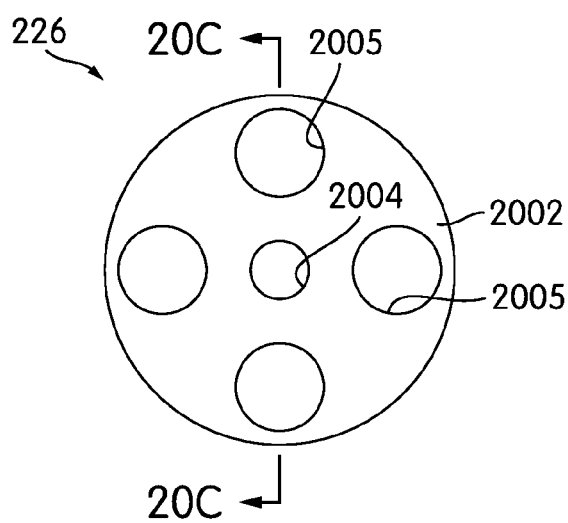
FIGS. 20B and 20C are respective vessel end and cross-sectional views of that fiber tube centralizer.
Figure 20C:
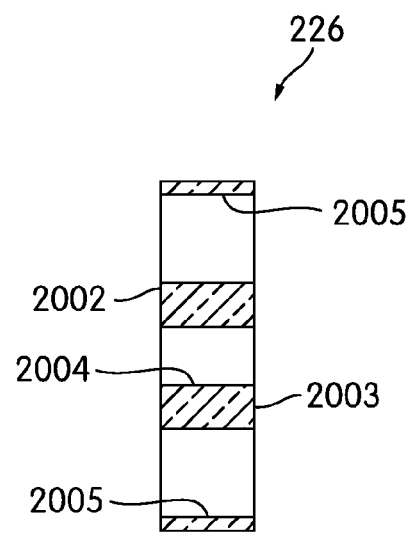

FIG. 20A is a perspective vessel end view of fiber tube centralizer 226. FIG. 20B is a vessel end view of centralizer 226. FIG. 20C is a cross-sectional view of centralizer 226 taken from the location indicated in FIG. 20B. In at least some embodiments, fiber tube centralizer 226 is machined or otherwise formed from brass (e.g., a free cutting brass). Other materials or combinations of material could alternatively be used. Corners and edges of centralizer 226 may have radii formed thereon.

Centralizer 226 is sized to fit within opening 617 of termination load cup nut 218. Centralizer 226 has a circular outer face 2001, a flat vessel-side face 2002 and a flat cable side face 2003. A central bore 2004 is formed in centralizer 226 to accommodate optical core 215 of cable 100. Four peripheral bores 2005 are formed in centralizer 226 to permit injection of epoxy resin during assembly of device 101, as discussed below.

As can be appreciated from the foregoing, components of device 101 have longitudinal axes corresponding to bores passing through those components. A longitudinal axis of centralizer 226 corresponds to the center of bore 2004, a longitudinal axis of disk 108 corresponds to the center of bore 221, a longitudinal axis of load cup nut isolator 106 corresponds to the center of bore 504, a longitudinal axis of conductor retainer 219 corresponds to the center of bore 703, a longitudinal axis of load cup nut 218 corresponds to the center of bore 615, a longitudinal axis of load cup 213 corresponds to the center of bore 212, a longitudinal axis of load cup isolator 208 corresponds to the center of bore 207, a longitudinal axis of housing 103 corresponds to the center of bore 202, a longitudinal axis of split collar cap 211 corresponds to the center of bore 1204, a longitudinal axis of isolator 206a corresponds to the center of bore 1302 (with the axes of isolators 206b-206d corresponding to centers of corresponding bores in isolators 206b-206d), a longitudinal axis of seal 205 corresponds to the center of bore 1402, a longitudinal axis of seal 203a corresponds to the center of bore 1502 (with the axis of seal 203b corresponding to a center of a corresponding bore in seal 203b), a longitudinal axis of centralizer 204 corresponds to the center of bore 1602, a longitudinal axis of backing ring 104 corresponds to the center of bore 1706, a longitudinal axis of collet 201 corresponds to the center of bore 1803, and a longitudinal axis of collet retainer 105 corresponds to the center of bore 1904. Upon assembly of device 101, these axes are parallel and generally coincident with each other, and with a longitudinal axis of the portion of cable 100 within assembly 101, so as to form a longitudinal axis of device 101.

The following describes one example of how device 101 may be assembled and attached to cable 100. For simplicity, minor procedural details that would be apparent to persons of ordinary skill in view of the disclosures herein are omitted.

First, certain components are placed onto cable 100 by threading cable 100 through the bore in each of those components. In order, those components are tail cone collet retainer 105, tail cone collet 201, tail cone backing ring 104, belt seal 203a, belt centralizer 204, belt seal 204b, belt seal 205, isolator 206a, isolator 206b, isolator 206c, isolator 206d, split collar cap 211, housing 103 and load cup isolator 208. At this stage, all of these elements may be separated from one another along a length of cable 100, with a free end of cable 100 extending past load cup isolator 208.

Next, layers of cable 100 are removed so as to expose steel wires 214 on the cable end. On the end-most portion of the cable, the steel wires and other layers (if any) are then removed so as to expose optical fiber core 215. At this stage, the endmost portion of cable 100 only includes optical core 215. An intermediate portion of the cable adjacent to the exposed core 215 includes fiber core 215 and steel wires 214. The main portion of the cable (with the above-mentioned elements threaded thereon) is adjacent to the intermediate portion and is fully intact, i.e., no layers have been removed. The intermediate portion may have a length approximately equal to the length of bore 212 of load cup 213 and the length of cavity 1102a of collar 210a (or cavity 1102b of collar 210b).

Next, collars 210a and 210b are placed around part of the intermediate cable portion closest to the main portion of the cable. In particular, the face of cavity 1102b of collar 210b is placed into contact with the exposed steel wires 215 on one side of the cable, and with the cable end of nose 1107b abutting the main portion of the cable. The face of cavity 1102a of collar 210a is placed into contact with the exposed steel wires 215 on the other side of the cable so as to place cavity 1102a opposite to cavity 1102b of collar 210b, and with the cable end of nose 1107a abutting the main portion of the cable. With collars 210a and 210b held in this position, bolts 1101 are inserted and tightened to clamp collars 210a and 210b onto cable 100.

Next, the end-most portion of cable 100 (fiber core 215 only) and the remaining part of the intermediate portion of cable 100 are threaded through bore 212 of load cup 213. Bolts are then inserted through holes 1108a and 1108b and into holes 806 of load cup 213 and tightened, thereby bolting clamped collars 210 to the cable-end side of load cup 213. Steel wires within cavity 804 may be manually splayed outward so as to permit flow of epoxy resin in a subsequent operation.

Next, core 215 of the endmost portion of cable 100 is threaded through bore 615 of load cup nut 218 as nut 218 is put into position on the vessel end of load cup 213 (i.e., as vessel-end portion 801 of load cup 213 is placed into enlarged region 614 of load cup nut 218). A backing ring and O-ring are placed into groove 613 prior to threading core 215 through nut 218 or placing nut 218 into position on load cup 213. Fiber tube centralizer 226 is then placed into opening 617, with fiber core 215 extending through bore 2004. While nut 218, load cup 213 and centralizer 226 are held in this configuration, epoxy resin is introduced through one or more of holes 2005 of centralizer 226 (FIG. 20B) so as to fill cavity 804 and bore 615 with that resin. That resin is then allowed to cure. Once the resin has hardened, cable 100 is potted to load cup 213, and a solid watertight mass fills cavity 804 and bore 615.

Next, an O-ring is placed into groove 604. Most of the plastic tubing of fiber core 215 is removed to expose the optical fibers. A section of that tubing having a length just less than that of enlarged opening 705 of conductor retainer 219 is left in place. The optical fibers are then threaded through bore 703 of retainer 219 as retainer 219 is put into place on the vessel end of load cup nut 218. Electrical terminals of two wires 111 are then inserted through holes 707 (of retainer 219) and into two of threaded holes 605 (of nut 218) and tightened to secure retainer 219 in position. Next, epoxy is introduced through hole 710 to fill the remaining space within bore 703 and opening 705. That epoxy is then allowed to harden.

Next, split collar cap 211 can be pushed into place over collars 210a and 210b. Termination load cup isolator 208 can then be pushed into position so that face 610 of load cup nut 218 is seated on shoulder 905 of load cup isolator 208. Isolators 206d-206a can then be pushed into position inside bore 207 of isolator 208. Housing 103 may then be pushed into position over isolator 208. Seal 205, seal 203b, centralizer 204 and seal 203a may then be pushed into place within bore 202 of housing 103. Backing ring 104 may then be pushed into position on the cable side of housing 103, followed by pushing of collet 201 into position (with anti-rotation pin 225 inserted between ring 104 and collet 201). Collet retainer 105 may then be moved into place and secured with bolts 223.

On the vessel end, anti-rotation pins 227 can be placed into holes 602 of nut 218. The optical fibers extending from the vessel side of retainer 219 may be threaded through tube 220. Tube 220 may then be put into place in cavity 704 of retainer 219 and secured with a set screw in hole 712. The optical fibers and the two electrical wires 111 may then be threaded through bore 504 of load cup nut isolator 106 as isolator 106 is put into place. Retaining ring 107 is then installed, with bolts 222 inserted through holes 402 (in collar 107) and 507 (in isolator 106) to threaded holes 1009 (in housing 103) and tightened. Finally, transition disk 108 is added by attaching standoffs 109 to ring 107, threading wires 111 through holes 302, threading the optical fibers and a small portion of tube 220 through hole 301, and screwing disk 108 to the vessel ends of standoffs 109.

As can be appreciated from the above description of termination device 101 and of the example assembly method, termination device 101 allows numerous advantages. For example, assembly of termination device 101 is simpler and can be performed more rapidly than is the case with previous termination device designs. Unlike other designs, assembling device 101 only requires two epoxy filling operations. The remaining assembly operations can be performed using ordinary tools. Assembly time can be further accelerated if a plastic-bonding fast-setting epoxy is used.

Moreover, collars 210a and 210b need only be clamped onto cable 100 by tightening mechanical fasteners. This is distinguished from earlier designs in which a collar or collar sections are soldered into place on a cable. Eliminating the need to attach a collar by soldering, welding or other metal fusing techniques speeds assembly and reduces the equipment needed to perform that assembly. In some embodiments, collar 210 might only have a single screw or other mechanical fastener that is tightened to clamp collar 210 to cable 100. For example, a pair of split collars could be joined on one side by a tab fitting into a recess to form a hinge. A single screw could then be inserted on the other side and tightened.

As another example of advantages provided by termination assemblies according to at least some embodiments, termination assembly 101 can be easily modified to accept cables of different sizes or types. For example, most of the components in a version of termination device 101 intended for a larger size cable could be identical to components in a version of termination device 101 intended for a smaller size cable. Only a relatively small number of components would vary based on cable size. In some such embodiments, those cable-specific components could include collars 210a and 210b, electrical isolators 206a-206d, seals 203a and 203b, seal 205, centralizer 104, backing ring 104 and collet 201. The remaining components could be generic to multiple cables. Of the cable-specific components, most have a very simple shape and are relatively easy to manufacture. Various "kits" or other collections of termination device components could be prepared. For example, a base kit could include cable-generic components of a termination device that would be the same regardless of cable size (e.g., collet retainer 105, housing 103, split collar cap 211, load cup 213, load cup isolator 208, load cup nut 218, conductor retainer 219, fiber tube centralizer 226, load cup nut isolator 106, retaining ring 107, fiber transition disk 108, wires 111, standoffs 109, and bolts 222, bolts 223, O-rings and backing ring, and other related hardware). A cable-specific kit could then include the components that would be specific to a cable size (e.g., collars 210a and 210b, electrical isolators 206a-206d, seals 203a and 203b, seal 205, centralizer 104, backing ring 104 and collet 201).

Notably, the components of termination device 101 configured to accommodate multiple cable sizes can be configured to provide electrical protection for voltages carried in larger cables. In some previous designs, a load cup nut might be separated from the housing or another grounded component by as little as 0.032 inches of insulation. Although this is adequate for lower voltages, larger cable sizes may carry voltages of up to 10 kV. Thus, additional insulation between high voltage components (e.g., load cup nut 218) and ground (e.g., housing 103 or metal components in contact with housing 103) is desired. In at least some embodiments, a load cup nut and other high voltage components are separated from the housing and conductive components in contact with the housing by at least 0.10 inches of non-conductive material. This minimum separation might be different in other embodiments (e.g., 0.20 inches).

In the embodiment of termination device 101, additional insulation between high voltage components and ground can be provided by extending the load cup isolator so that it completely surrounds the load cup nut. In particular, and as seen by comparing FIGS. 2, 6C and 9C, offset sleeve 901 of load cup isolator 208 completely surrounds the perimeter of load cup nut 218. Additional protection is also provided by forming load cup nut isolator 106 as a single piece that surrounds load cup nut 218.

Split collar cap 211 also provides additional protection in connection with high voltages. The smooth outer surface of cap 211 helps to prevent coronal discharge. Cap 211 further helps to contain coronal discharge that might occur from corners, edges or other surface features of collars 210a and 210b.

As can be further appreciated from FIG. 2, device 101 provides multiple levels of watertight protection. When device 101 is attached to a vessel, a first level of watertight protection is created by O-rings 114 (creating a seal against the walls of the vessel opening that receives device 101) and by seals 205 and 203b. In particular, and so long as the watertight integrity of cable 100 is maintained, water from the external environment cannot enter the vessel through the first level seals.

A second level of protection is formed by the O-ring in groove 613 of load cup nut 218, by the O-ring in groove 604 of load cup nut 218, and by the epoxy that fills bore 703 of conductor retainer 219. If a portion of cable 100 leading up to device 101 were severed, water might be forced into the cable 100 inner layers. If this occurs, the second level seals prevent water from entering the vessel interior through cable 100.

Device 101 also provides several levels of anti-rotation protection. As indicated above, pin 225 is located in a position offset from cable 100. Pin 225 resists rotation of collet 201, and thus of cable 100 clamped within collet 201, relative to housing 103 about an axis parallel to the longitudinal axis of device 101. The shape of the epoxy mass within load cup 213 and load cup nut 218 resists rotation of cable 100 relative to load cup 213 and load cup nut 218 about the device 101 longitudinal axis. Load cup nut 218 is configured to resist rotation relative to housing 103 about the device 101 longitudinal axis by the presence of pins 227.

In some embodiments, termination device 101 is also configured for in situ pressure testing once device 101 has been almost fully assembled. As seen in FIG. 10E, housing 103 includes a test port 1011. In an assembled device 101, port 1011 is located over centralizer 204 and between seals 203a and 203b. With backing ring 104 and collet retainer 105 loosened (or not yet connected), water can be pumped through port 1011 at a pressure corresponding to a pressure expected at a particular depth (or to that pressure multiplied by a safety factor) and housing 103 checked for leaks at the cable end.

Figure 21:
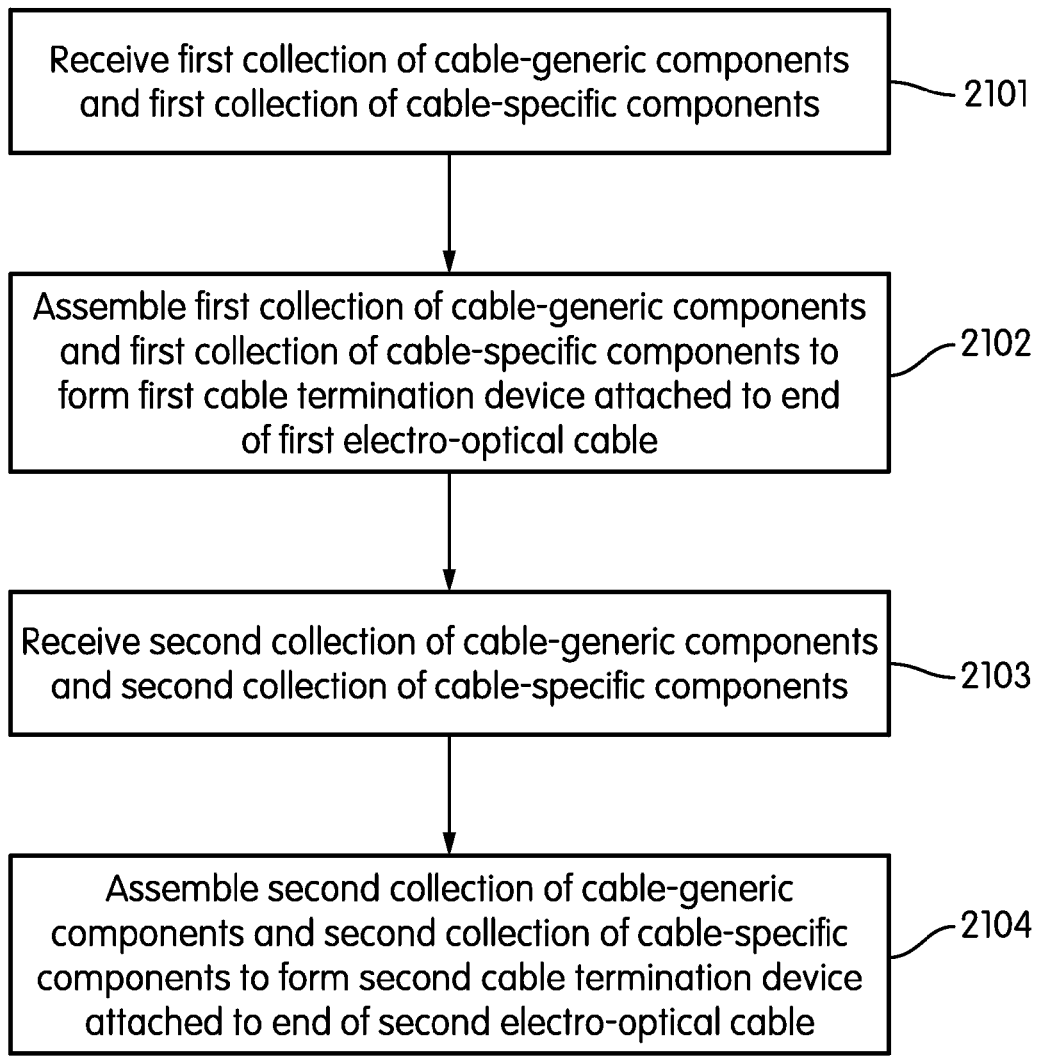
FIG. 21 is a block diagram of a method, according to some embodiments, for assembling cable termination devices.

FIG. 21 is a block diagram of a method, according to some embodiments, for assembling cable termination devices. In step 2101, an assembler receives a first collection of cable-generic components and a first collection of cable-specific components. The first collection of cable-generic components may be, e.g., a kit of cable-generic components as previously described. The first collection of cable-specific components may be, e.g., a kit of cable-specific components as previously described. In step 2102, the first collection of cable-generic components and the first collection of cable-specific components are assembled to form a first cable termination device attached to an end of a first electro-optical cable. The assembly of step 2102 may be in accordance with the assembly steps described above.

In step 2103, the assembler receives a second collection of cable-generic components and a second collection of cable-specific components. The second collection of cable-generic components may be another kit of cable-generic components. The individual components in the second collection of cable-generic components may be substantially identical to the individual components in the first collection of cable-generic components. The second collection of cable-specific components may be a kit of cable-specific components sized (and/or otherwise configured) for a second electro-optical cable and not sized (and/or otherwise configured) for the first electro-optical cable. The second electro-optical cable may be of a different design and/or of a different size than the first electro-optical cable.

In step 2104, the second collection of cable-generic components and the second collection of cable-specific components are assembled to form a second cable termination device attached to an end of the second electro-optical cable. The assembly of step 2104 may also be in accordance with the assembly steps described above. Steps 2103 and 2104 may occur contemporaneously with steps 2101 and 2102, i.e., the assembler may simultaneously assemble the first and second cable termination devices. Alternatively, a time period may separate the performance of steps 2101 and 2102 and the performance of steps 2103 and 2104. That time period may be relatively brief (e.g., a few minutes) or protracted (e.g., several hours, several days, several weeks, or more).

Figure 22A:
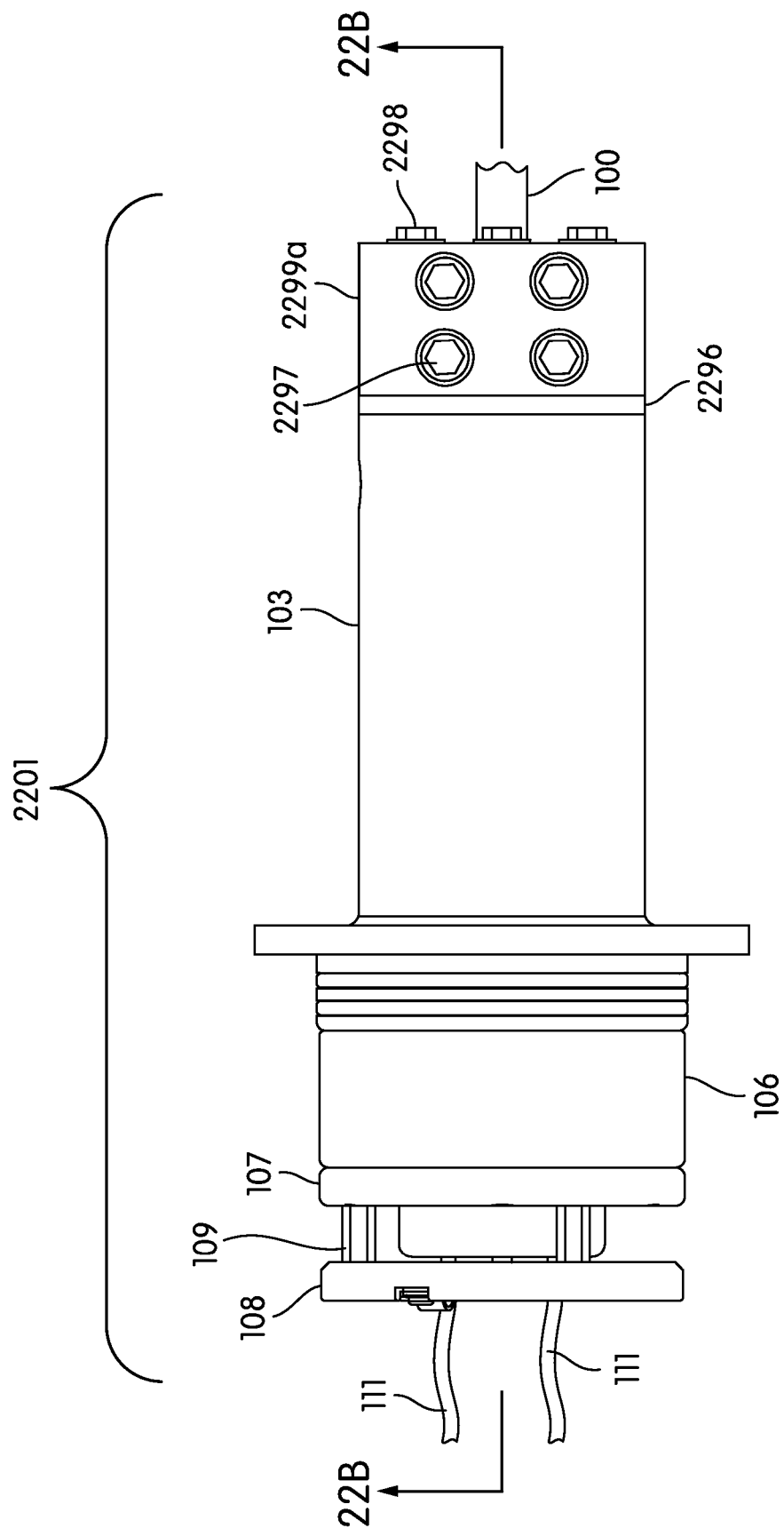
FIGS. 22A and 22B are respective side and cross-sectional views of a cable termination device according to some embodiments.
Figure 22B:
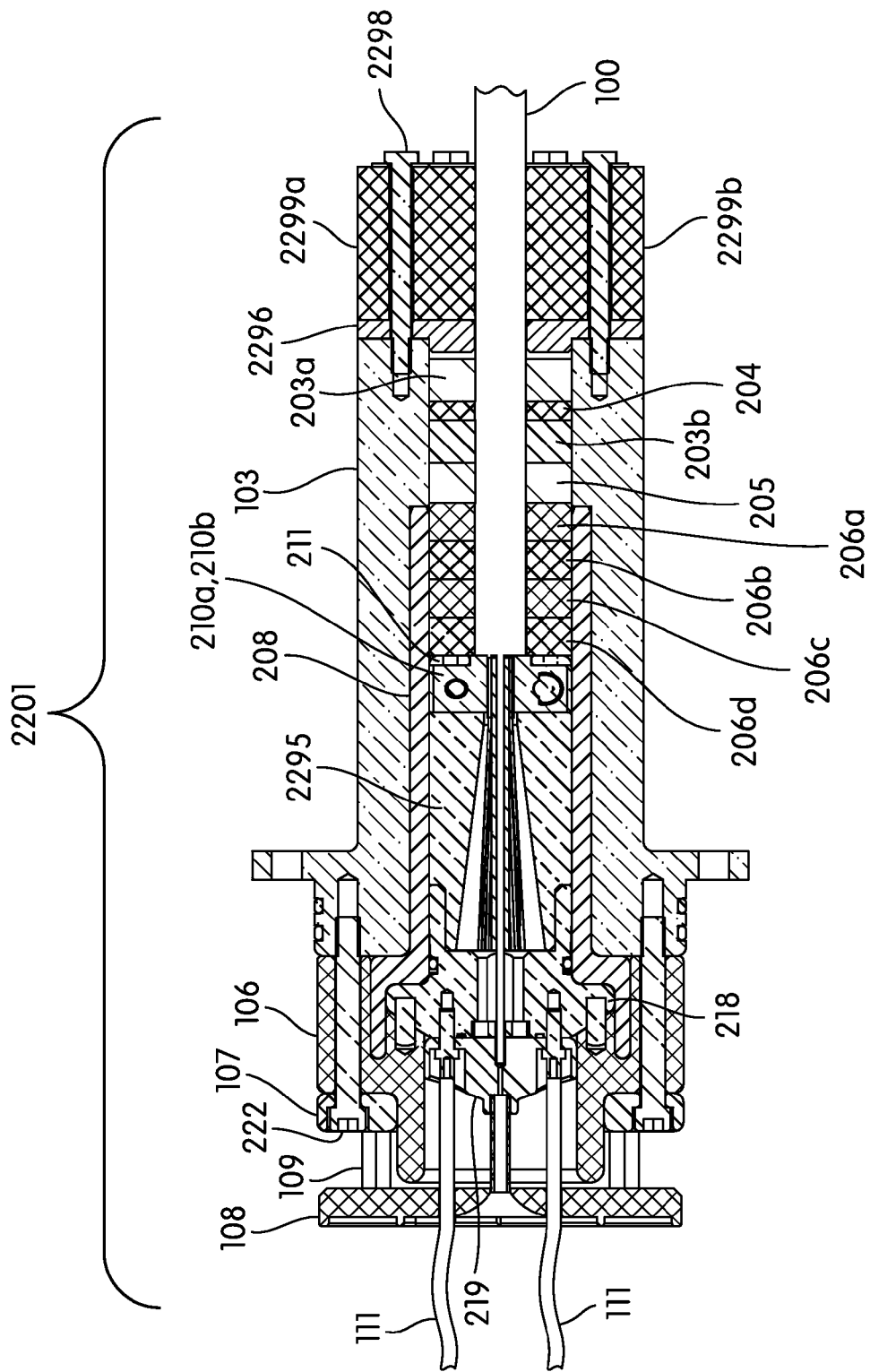

FIG. 22A is a side view of a cable termination device 2201 according to another embodiment. FIG. 22B is a cross-sectional view of termination device 2201 taken from the location indicated in FIG. 22A. Termination device 2201 includes a termination load cup 2295 having an internal geometry that differs from the internal geometry of load cup 213. Backing ring 104, collet 201 and tail cone collet retainer 105 of termination device 101 have been replaced with backing ring 2296, upper tail cone collet retainer 2299a, lower tail cone collet retainer 2299b, and a pair of shims (not shown in FIGS. 22A and 22B) in termination device 2201. Termination device 2201 is otherwise the same as termination device 101. Components of termination device 2201 and of termination device 101 having the same reference characters are identical.

FIGS. 23A through 25B show individual components of termination device 2201. So as to provide additional detail, the views of various components in certain of FIGS. 23A through 25B are enlarged relative the manner in which those same components are depicted in FIG. 22B. The degree of enlargement is not necessarily the same throughout FIGS. 23A-25B. The relative sizes of these components and of other individual device 2201 components can be seen in FIG. 22B, however.

Figure 23A:
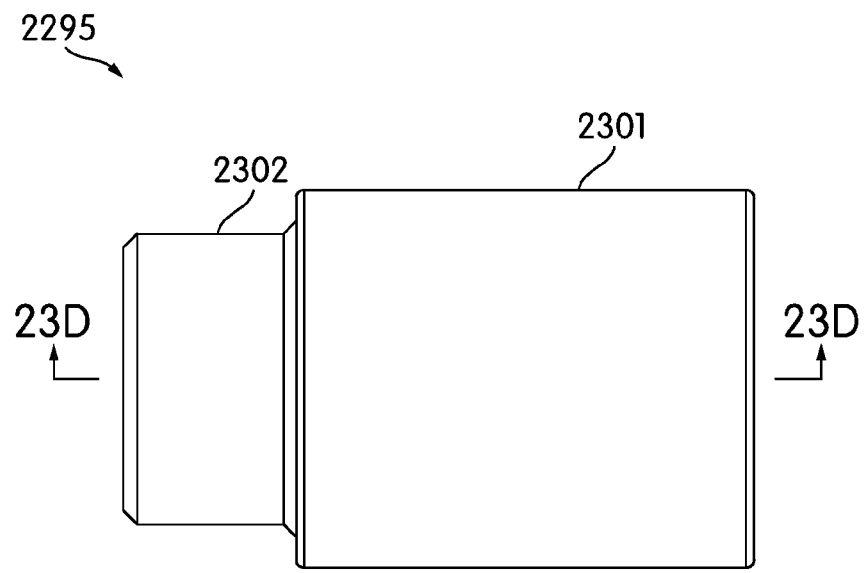
FIG. 23A is a side view of a termination load cup from the cable termination device of FIGS. 22A and 22B.
Figure 23B:
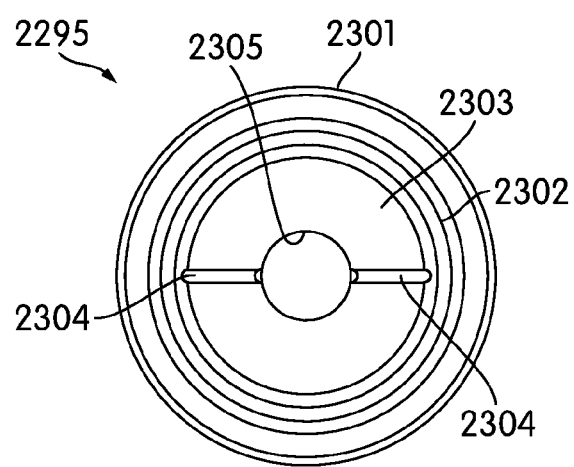
FIGS. 23B through 23D are vessel end, cable end and cross-sectional views, respectively, of that termination load cup.
Figure 23C:
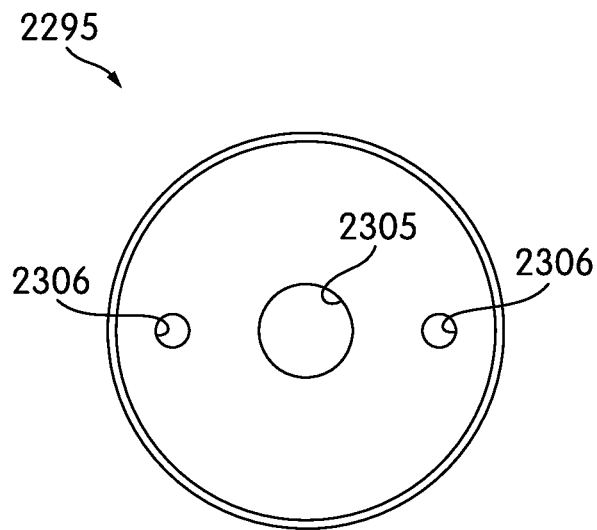
Figure 23D:
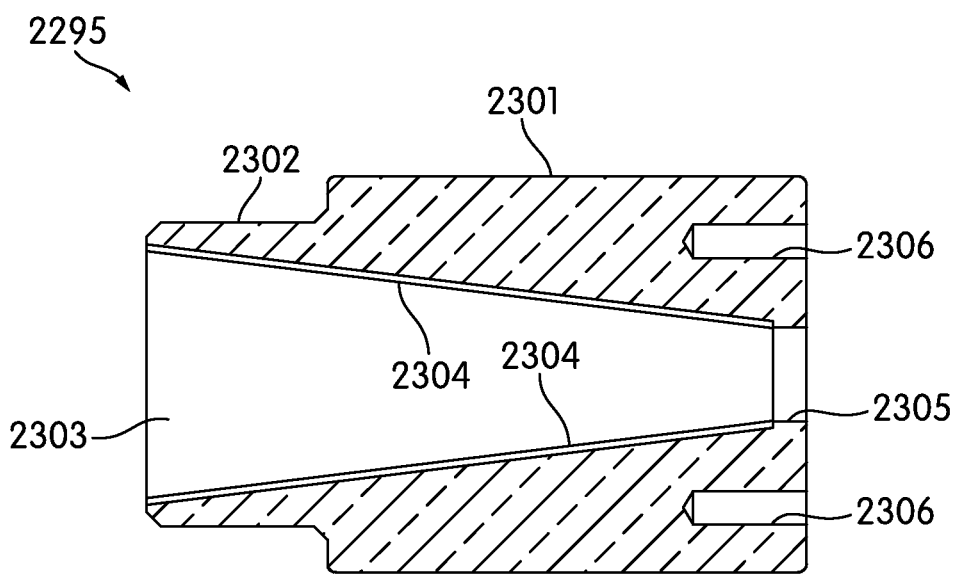

FIG. 23A is a side view of termination load cup 2295. FIG. 23B is a vessel end view of load cup 2295. FIG. 23C is a cable end view of load cup 2295. FIG. 23D is a cross-sectional view of load cup 2295 from the location indicated in FIG. 23A. In at least some embodiments, load cup 2295 may be machined or otherwise formed from bronze (e.g., a nickel aluminum bronze). Load cup 2295 includes a reduced-diameter vessel-end portion 2302 and a larger diameter main portion 2301 that are respectively the same as portions 801 and 802 of load cup 213 (see FIG. 8D). Load cup 2295 further includes a bore 2305 and threaded holes 2306 that are respectively similar to bore 212 and holes 806 of load cup 213.

The vessel side of bore 2305 is enlarged to form a frusto-conical chamber 2303 similar to chamber 804 of load cup 213. Instead of channels such as channels 805 in load cup 213, however, chamber 2303 includes a pair of narrower channels 2304 that extend the length of chamber 2303. As with load cup 213, a potted connection between cable 100 and load cup 2395 is created by filling chamber 2303 with epoxy after the ends of cable 100 steel wires 214 are splayed within chamber 2303, and after load cup nut 218 and centralizer 226 are put into place. When the epoxy hardens, the resulting solid mass includes projections into grooves 2304. Those projections help prevent that solid mass from rotating relative to load cup 2295.

Load cup 2295 may be machined or otherwise formed from the same materials that may be used to form load cup 213. Corners and edges of load cup 2295 may have radii formed thereon.

Figure 24:
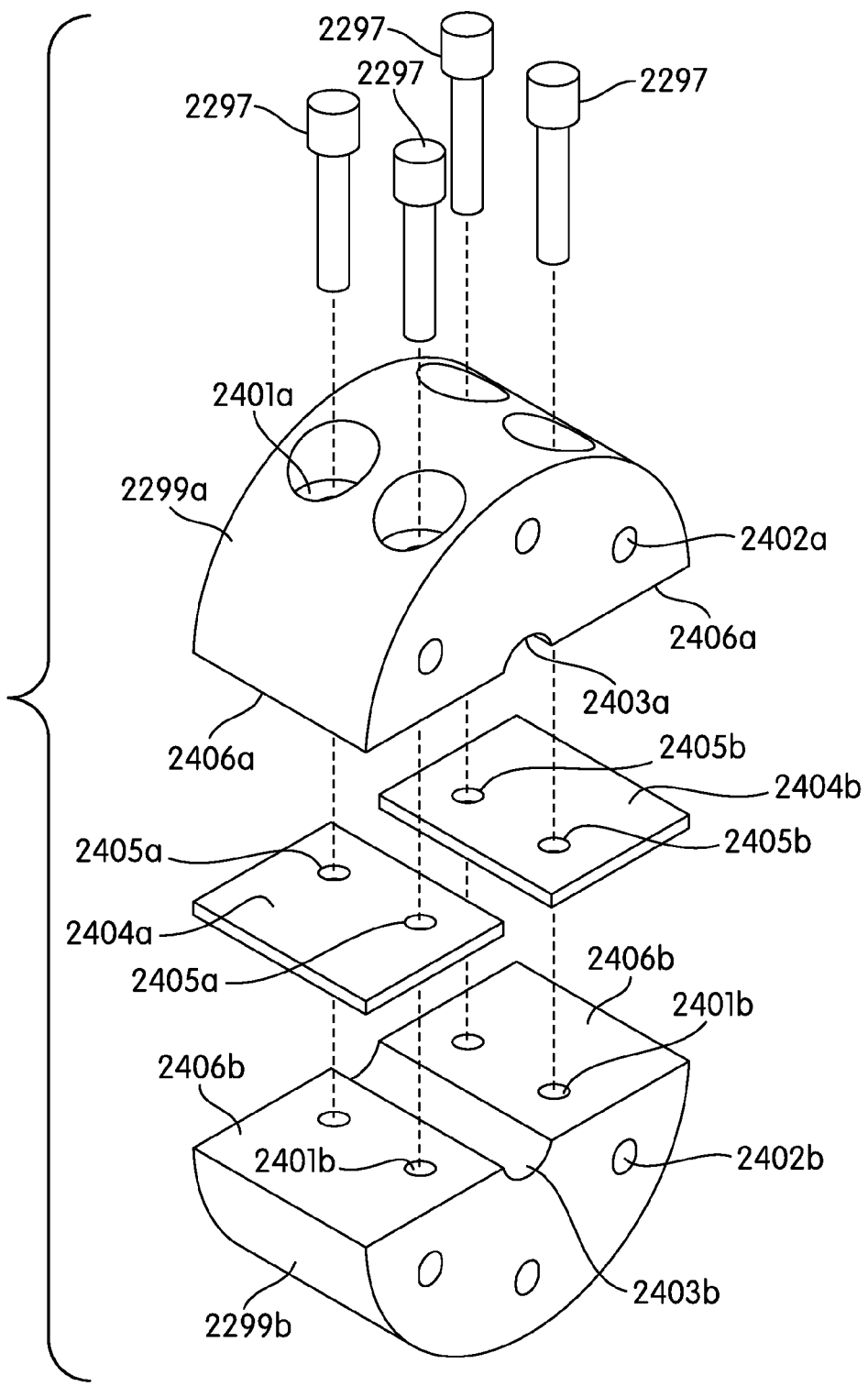
FIG. 24 is a perspective cable end view of an upper tail cone collet retainer, a lower tail cone collet retainer, shims, and bolts from the cable termination device of FIGS. 22A and 22B and in a separated condition.

FIG. 24 is a perspective cable end view of upper tail cone collet retainer 2299a, lower tail cone collet retainer 2299b, shims 2404a and 2404b, and bolts 2297 in a separated condition. Upper retainer 2299a includes three through-holes 2402a. Three bolts 2298 pass through holes 2402a (see FIGS. 22A and 22B). A groove 2403a formed in the lower portion of retainer 2299a extends the entire thickness of retainer 2299a. Upon assembly of device 2201, groove 2403a forms an upper portion of a hole through which cable 100 passes. The surface of groove 2403a may be threaded so as to grip the outer jacket of cable 100. Lower retainer 2299b similarly includes three through-holes 2402b, as well as a groove 2403b extending the entire thickness of lower retainer 2299b. Three additional bolts 2298 pass through holes 2402b. Upon assembly of device 2201, groove 2403b forms a lower portion of a hole through which cable 100 passes. The surface of groove 2403b may also be threaded so as to grip the outer jacket of cable 100.

Upper retainer 2299a includes two planar mating faces 2406a located on opposite sides of groove 2403a. Lower retainer 2299b similarly includes two planar mating faces 2406b located on opposite sides of groove 2403b. A first shim 2404a rests between one mating face 2406a and one mating face 2406b and includes two holes 2405a through which two of bolts 2297 pass. A second shim 2404b rests between the other mating face 2406a and the other mating face 2406b and includes two holes 2405b through which the other two of bolts 2297 pass. Upper retainer 2299a includes four shouldered holes 2401a that pass through retainer 2299a. Two of holes 2401a have openings (not shown) in one mating face 2406a that align with holes 2405a of shim 2404a and with threaded holes 2401b in one of mating faces 2406b. The other two holes 2401*a* have openings (not shown) in the other mating face 2406*a* that align with holes 2405*b* of shim 2404*b* and with threaded holes 2401*b* in the other of mating faces 2406*b*. Retainers 2299*a* and 2299*b* and shims 2404*a* and 2404*b* can be formed from, e.g., 30% glass-filled nylon. Other materials or combinations of materials could alternatively be used. Corners and edges of retainers 2299*a* and 2299*b* and of shims 2404*a* and 2404*b* could have radii formed thereon.

Figure 25A:
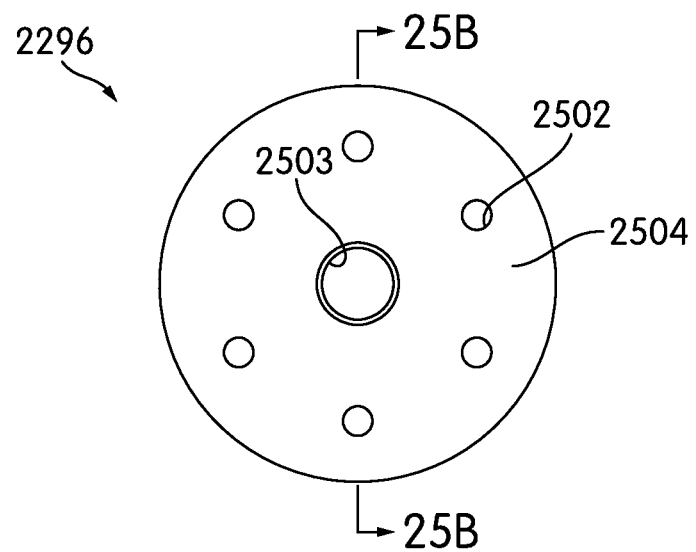
FIGS. 25A and 25B are vessel end and cross-sectional views, respectively, of a backing ring from the cable termination device of FIGS. 22A and 22B.
Figure 25B:
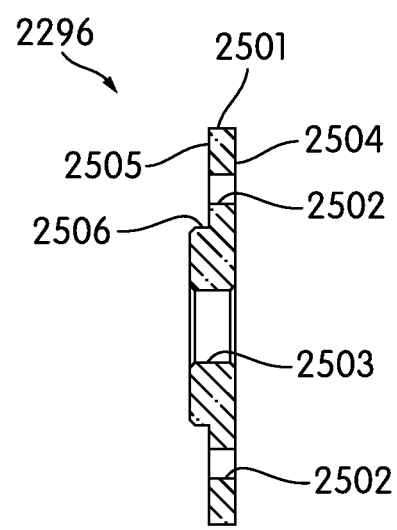

FIG. 25A is a vessel end view of backing ring 2296. FIG. 25B is a cross-sectional view of backing ring 2296 taken from the location indicated in FIG. 25A. Unlike backing ring 104 of device 101, the cable side face 2504 of backing ring 2296 is generally flat. In particular, backing ring 2296 lacks a cable side nose such as nose 1705 of backing ring 104 (see FIG. 17C). Backing ring 2296 also lacks a hole such as hole 1708 of backing ring 104. Otherwise, backing ring 2296 is generally similar to backing ring 104. Outer circumference 2501, vessel side face 2505, holes 2502 and bore 2503 of backing ring 2296 are respectively similar to outer circumference 1701, vessel side face 1702, holes 1707 and bore 1706 of backing ring 104. Backing ring 2296 may be machined or otherwise formed from the same materials that may be used to form backing ring 104. Corners and edges of backing ring 2296 may have radii formed thereon.

Cable termination device 2201 can be assembled in a manner similar to that by which device 101 is assembled. However, retainers 2299*a* and 2299*b* need not be attached to cable 100 at the beginning of the assembly process. Instead, retainers 2299*a* and 2299*b*, shims 2404*a* and 2404*b* and bolts 2297 can be loosely assembled around cable 100 after assembly of other device 2201 components. Three bolts 2298 can then be placed through holes 2402*a* and through three of holes 2502 in backing ring 2296 and threaded into three of holes 1004 in cable side face 1005 of housing 103. Three additional bolts 2298 can then be placed through holes 2402*b* and through the other three holes 2502 in backing ring 2296 and threaded into the remaining three holes 1004 in housing 103. The six bolts 2298 can be tightened, after which bolts 2297 can be tightened.

As can be appreciated from the foregoing, cable termination device 2201 offers many of the same advantages of cable termination device 101. A cable termination device such as device 2201 can be used in connection with the methods such as those described in connection with FIG. 1.

Additional embodiments may include numerous variations on the embodiments described thus far. For example, and even if not specifically stated above in connection with a specific component, materials and/or material combinations other than those described above may be used. As another example, sizes, shapes and relative positions of components may be varied. All features described in connection with termination device 101 and/or termination device 2201 may not be present in some embodiments. Such embodiments may also or alternatively include features in addition to those described above.

Embodiments of the invention include, without limitation, assembled termination devices, assembled termination device and cable combinations, individual components of termination devices, "kits" or other collections of termination device components, methods of assembling termination devices, and methods of using termination devices.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments or otherwise disclosed herein are the within the scope of the invention.

The invention claimed is:

1. A cable termination device comprising:
   a cable termination device housing having a housing bore formed therein, the housing configured for water-tight attachment to vessel;
   a load cup isolator having a load cup isolator bore formed therein, wherein the load cup isolator comprises an electrically nonconductive material and is located at least partially within the housing bore;
   a load cup having a load cup bore formed therein, wherein the load cup comprises an electrically conductive material, is attached to tensile members of a cable, and is located at least partially within the load cup isolator bore and at least partially within the housing bore; and
   a load cup nut in contact with an end of the load cup, wherein all parts of the load cup nut are separated from the housing and conductive components in electrical communication with the housing by at least 0.10 inches of nonconductive material.

2. The cable termination device of claim 1, wherein the cable comprises a fiber optic core and the cable tensile members comprise a layer of metal strands surrounding the fiber optic core, and wherein
   the load cup includes a cavity,
   a portion of the cable including the metal strands extends through the load cup cavity and the metal strands are potted to the load cup, and
   at least a portion of the fiber optic core extends from the load cup cavity and through the load cup nut.

3. The cable termination device of claim 2, wherein all parts of the load cup nut are separated from the housing and conductive components in electrical communication with the housing by at least 0.20 inches of nonconductive material.

4. The cable termination device of claim 2, wherein the load cup isolator includes a first portion separating the load cup nut from the housing.

5. The cable termination device of claim 2, wherein the load cup isolator includes an offset sleeve portion surrounding a perimeter of the load cup nut.

6. The cable termination device of claim 2, wherein the load cup isolator includes a first portion separating the load cup nut from the housing and an offset sleeve portion surrounding a perimeter of the load cup nut.

7. The cable termination device of claim 6, further comprising a load cup nut isolator surrounding the offset sleeve portion of the load cup isolator.

8. The cable termination device of claim 7, wherein the load cup nut isolator is configured not to rotate relative to the load cup nut about an axis parallel to axes of the housing, load cup isolator and load cup bores.

9. The cable termination device of claim 2, further comprising a separate load cup nut isolator surrounding the load cup nut.

10. The cable termination device of claim 9, wherein the load cup nut isolator is a single piece.

11. The cable termination device of claim 2, wherein the load cup cavity is defined by a frustoconical interior wall having plurality of grooves formed in sides of the interior wall, and wherein the grooves are filled with extensions of material forming a potted connection between metal strands and the load cup.

12. The cable termination device of claim 2, further comprising a tail cone collet and an anti-rotation pin, and wherein
the housing includes first and second ends and the housing bore extends between the first and second housing ends,
the load cup nut is located at the second housing end,
a portion of the cable extends through the bore, from the first housing end, and through the collet,
the collet is clamped to the portion of the cable extending therethrough and is fixed relative to the housing, and
the anti-rotation pin extends into the collet at a location offset from the portion of the cable extending through the collet and is positioned to resist rotation of the collet, relative to the housing, about an axis parallel to an axis of the housing bore.

13. The cable termination device of claim 2, further comprising a two annular seals, and wherein
the housing includes first and second ends and the housing bore extends between the first and second housing ends,
the load cup nut is located at the second housing end,
the two annular seals are located in the housing bore between the load cup isolator and the first housing end,
a portion of the cable extends through the annular seals,
the housing includes a test port opening, the test port opening extending through a wall of the housing and intersecting the housing bore at location between the annular seals.

14. The cable termination device of claim 2, further comprising first and second split collars, and wherein
the housing includes first and second ends and the housing bore extends between the first and second housing ends,
the load cup nut is located at the second housing end,
each of the first and second split collars includes a surface in electrical communication with the metal strands,
the first and second split collars are joined by at least one mechanical fastener and clamped to the cable, and
the first and second split collars are located adjacent to the load cup and between the load cup and the first housing end.

15. The cable termination device of claim 14, further comprising a split collar cap surrounding the split collars.

16. A cable termination device comprising:
a cable termination device housing configured for watertight attachment to a vessel, the housing having first and second ends and a housing bore extending between the first and second housing ends;
a load cup isolator comprising an electrically nonconductive material and having a load cup isolator bore extending therethrough, a main portion, an offset sleeve portion, and a connecting portion connecting the offset sleeve portion to the main portion, the load cup isolator main portion located within the housing bore, and the connecting portion located outside the housing bore adjacent to the second housing end;
a load cup comprising an electrically conductive material and having a load cup bore extending therethrough, the load cup being attached to tensile members of a cable and being located within the housing and the load cup isolator bores; and
a load cup nut in contact with the load cup, the load cup nut having an outer perimeter surrounded by the load cup isolator offset sleeve portion.

17. The cable termination device of claim 16, wherein the cable comprises a fiber optic core and the cable tensile members comprise a layer of metal strands surrounding the fiber optic core, and wherein
the load cup includes a cavity,
a portion of the cable including the metal strands extends through the load cup cavity and the metal strands are potted to the load cup, and
at least a portion of the fiber optic core extends from the load cup cavity and through the load cup nut.

18. The cable termination device of claim 17, further comprising a load cup nut isolator surrounding the offset sleeve portion of the load cup isolator.

19. The cable termination device of claim 18, wherein the load cup nut isolator is configured not to rotate relative to the load cup nut about an axis parallel to axes of the housing, load cup isolator and load cup bores.

20. The cable termination device of claim 17, wherein the load cup cavity is defined by a frustoconical interior wall having plurality of grooves formed in sides of the interior wall, and wherein the grooves are filled with extensions of material forming a potted connection between metal strands and the load cup.

21. The cable termination device of claim 17, further comprising a tail cone collet and an anti-rotation pin, and wherein
the load cup nut is located at the second housing end,
a portion of the cable extends through the housing bore, from the first housing end, and through the collet,
the collet is clamped to the portion of the cable extending through the collet and is fixed relative to the housing, and
the anti-rotation pin extends into the collet at a location offset from the portion of the cable extending through the collet and is positioned to resist rotation of the collet, relative to the housing, about an axis parallel to an axis of the housing bore.

22. The cable termination device of claim 17, further comprising a two annular seals, and wherein
the load cup nut is located at the second housing end,
the two annular seals are located in the housing bore between the load cup isolator and the first housing end,
a portion of the cable extends through the annular seals, and
the housing includes a test port opening, the test port opening extending through a wall of the housing and intersecting the housing bore at a location between the annular seals.

23. The cable termination device of claim 17, further comprising first and second split collars, and wherein
the load cup nut is located at the second housing end,
each of the first and second split collars includes a surface in electrical communication with the metal strands,
the first and second split collars are joined by at least one mechanical fastener and clamped to the cable, and
the first and second split collars are located adjacent to the load cup and between the load cup and the first housing end.

24. The cable termination device of claim 23, further comprising a split collar cap surrounding the split collars.

25. A method comprising:
receiving a first collection of cable-generic components and a first collection of cable-specific components, the first collection of cable-generic components including a cable termination device housing and a load cup, the first collection of cable-specific components including at least one component configured for a first electro-optical cable;

assembling the first collection of cable-generic components and the first collection of cable-specific components to form a first cable termination device attached to an end of the first electro-optical cable;

receiving a second collection of cable-generic components and a second collection of cable-specific components, wherein the second collection of cable-generic components includes a cable termination device housing and a load cup substantially identical to the cable termination device housing, second collection of cable-specific components includes at least one component configured for a second electro-optical cable and not configured for the first electro-optical cable; and assembling the second collection of cable-generic components and the second collection of cable-specific components to form a second cable termination device attached to an end of the second electro-optical cable.

26. The method of claim 25, wherein the second electro-optical cable is of a different size than the first electro-optical cable.

27. An apparatus comprising:

a cable termination device housing having a housing bore formed therein, the housing configured for water-tight attachment to vessel;

a load cup isolator having a load cup isolator bore formed therein, wherein the load cup isolator comprises an electrically nonconductive material;

a load cup having a load cup bore formed therein, wherein the load cup comprises an electrically conductive material and is configured for attachment to tensile members of a cable; and a load cup nut, wherein the load cup nut, the housing, the load cup isolator and the load cup are configured for placement into an assembled condition in which the load cup isolator is located at least partially within the housing bore, the load cup is located at least partially within the load cup isolator bore and at least partially within the housing bore, the load cup nut is in contact with an end of the load cup, and all parts of the load cup nut are separated from the housing and conductive components in electrical communication with the housing by at least 0.10 inches of nonconductive material.

* * * * *